(12) United States Patent
Kousaka et al.

(10) Patent No.: US 10,768,978 B2
(45) Date of Patent: *Sep. 8, 2020

(54) MANAGEMENT SYSTEM AND MANAGEMENT METHOD FOR CREATING SERVICE

(71) Applicant: Hitachi, Ltd., Tokyo (JP)

(72) Inventors: Kazuya Kousaka, Tokyo (JP); Hidenori Akatoki, Tokyo (JP); Ayumi Hayakawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/261,915

(22) Filed: Jan. 30, 2019

(65) Prior Publication Data
US 2019/0163520 A1 May 30, 2019

Related U.S. Application Data

(63) Continuation of application No. 15/125,708, filed as application No. PCT/JP2014/081632 on Nov. 28, 2017, now Pat. No. 10,223,157.

(51) Int. Cl.
*G06F 9/48* (2006.01)
*G06F 8/36* (2018.01)
(Continued)

(52) U.S. Cl.
CPC .......... *G06F 9/4843* (2013.01); *G06F 3/0482* (2013.01); *G06F 3/04817* (2013.01); *G06F 8/36* (2013.01)

(58) Field of Classification Search
CPC .. G06F 9/4843; G06F 3/04817; G06F 3/0482; G06F 8/36
See application file for complete search history.

(56) References Cited

U.S. PATENT DOCUMENTS

| | | | |
|---|---|---|---|
| 2008/0051921 A1 | 2/2008 | Nammatsu | |
| 2009/0083558 A1* | 3/2009 | Sugiki | G06F 1/3203 713/320 |
| 2014/0109078 A1 | 4/2014 | Lang | |

FOREIGN PATENT DOCUMENTS

| | | |
|---|---|---|
| JP | 2014-164724 A | 9/2014 |
| JP | 2014-197278 A | 10/2014 |
| WO | 2013/140609 A1 | 9/2013 |

OTHER PUBLICATIONS

International Search Report of PCT/JP2014/081632 dated Jan. 6, 2015.

* cited by examiner

*Primary Examiner* — Kavita Padmanabhan
*Assistant Examiner* — Bille M Dahir
(74) *Attorney, Agent, or Firm* — Mattingly & Malur, PC

(57) ABSTRACT

A management system coupled to an operation target system including one or more operation target apparatuses (1) manages a plurality of components each including a component input property and a processing content to be executed based on an input value that is input to the component input property; (2) creates or edits a service template that is associated with one or more components and an execution order and that includes one or more template input properties; (3) receives a designation of a service template and an input value to be input to the template input property; (4) generates, based on the designated input value and the service template, an operation service for executing the processing content included in the component using the designated input value; and (5) executes the generated operation service to operate the operation target apparatus.

12 Claims, 25 Drawing Sheets

(51) Int. Cl.
*G06F 3/0481* (2013.01)
*G06F 3/0482* (2013.01)

Component management table 421

| # | Component name | Version | Executable file path | Component uk |
|---|---|---|---|---|
| 1 | Provisioning volume | 01.00.00 | C:\HCSA\ProvisioningVolume\010000\···.bat | 1 |
| 2 | Provisioning volume | 01.10.00 | C:\HCSA\ProvisioningVolume\011000\···.bat | 2 |
| 3 | Create pair volume | 01.00.00 | C:\HCSA\CreatePairVolume\010000\···.bat | 3 |
| 4 | ··· | ··· | ··· | ··· |

FIG. 7

Component property management table 422

| # | Component uk | Display name | Key name | Initial value | Input/output type | Property group | Customized UI generation information |
|---|---|---|---|---|---|---|---|
| 1 | 1 | HostName | storage.host.name | Null | In | Host Group | List |
| 2 | 1 | Number of Volume | storage.number | Null | In | Volume usage Group | Integer |
| 3 | 1 | Volume Capacity | storage.capacity | 10GB | In | Volume usage Group | Unit list |
| 4 | 1 | Number of path | storage.number | 2 | In | Host Group | Integer |
| 5 | 1 | Volume uk | storage.volume.uk | Null | Out | Null | Null |
| 6 | 1 | Path info | storage.path.info | Null | Out | Null | Null |
| 7 | 2 | HostName | storage.host.name | Null | In | Host Group | List |
| 8 | 2 | Volume uk | storage.volume.uk | Null | In | Volume usage Group | Integer |
| 9 | 2 | Path info | storage..path.info | Null | In | Path Info Group | Text field |
| ... | | ... | ... | ... | ... | ... | ... |

ST management table 423

| # | ST name | ST version | ST uk | Flow uk | ST type |
|---|---|---|---|---|---|
| 1 | Provisioning & pair | 01.00.00 | 1 | 1 | Release |
| 2 | Provisioning & pair | 01.10.00 | 2 | 2 | Debug |
| 3 | provisioning | 01.00.00 | 3 | 3 | Release |
| ... | ... | ... | ... | ... | ... |

Flow management table 424

| # | Flow uk | Component uk List | Property mapping list |
|---|---------|-------------------|----------------------|
| 1 | 1 | 1, 2 | {Service property uk(1)= Component uk(1). storagehost.name},{Service property uk(2)=Component uk(2). storage.volume.uk}, {Component uk(1). storage.pathinfo = Component uk(2). storage.pathinfo}, ... |
| 2 | 2 | 1 | {Service property uk(8)= Component uk(1). storagehost.name},{Service property uk(9)=Component uk(1).. storage.volume.uk}, ... |
| 3 | 3 | 2 | Null |
| ... | ... | ... | ... |

ST property management table 425

| # | ST uk | ST property uk | Display name | Key name | Input/output type | Property group | Customized UI generation information |
|---|---|---|---|---|---|---|---|
| | 1001 | 1002 1003 | 1004 | 1005 | 1006 | 1007 | 1008 |
| 1 | 1 | 1 | HostName | service1.host.name | In | Host Group | List |
| 2 | 1 | 2 | Number of Volime | service1.volume.number | In | Volume usage Group | Integer |
| 3 | 1 | 3 | Volume Capacity | service1.volume.capacity | In | Volume usage Group | Unit list |
| 4 | 1 | 4 | Number of path | service1.path.number | In | Path Info Group | Integer |
| 5 | 1 | 5 | Path generation number | service1.pair.generation.number | In | Path Info Group | Integer |
| 6 | 1 | 6 | Volume uk | service1.volume.uk | Out | Null | Null |
| 7 | 1 | 7 | Path info | service1.path.info | Out | Null | Null |
| ... | ... | ... | ... | ... | ... | ... | ... |

FIG. 11

Service management table 426

| # | Service name | Service explanation | ST uk | Service uk |
|---|---|---|---|---|
| 1 | execute Provisioning & pair | Provisioning volume and then create pair volume | 1 | 1 |
| 2 | execute Provisioning & pair 2 | Provisioning volume and then create pair volume | 1 | 2 |
| 3 | execute provisioning | Provisioning volume | 3 | 3 |
| 4 | ... | ... | ... | ... |

FIG. 12

Service property setting table 427

| # | Property set value | Service template property uk | Service uk |
|---|---|---|---|
| 1 | STORAGEHOST | 1 | 1 |
| 2 | 1 | 2 | 1 |
| 3 | 20 | 3 | 1 |
| 4 | Null | 4 | 1 |
| 5 | 2 | 5 | 1 |
| 6 | STORAGEHOST2 | 1 | 2 |
| 7 | 2 | 2 | 2 |
| 8 | ... | ... | ... |

1201  1202  1203  1204

MANAGEMENT SYSTEM AND MANAGEMENT METHOD FOR CREATING SERVICE

TECHNICAL FIELD

This invention relates generally to an operation automation technology for an operation target apparatus.

BACKGROUND ART

Computer systems have been scaled up in recent years, thus increasing labor hours for constructing a computer system and operating an apparatus to be operated (operation target apparatus). An automation technology is a technology for automating management and maintenance (hereinafter referred to collectively as "operation") of such an operation target apparatus. PTL 1 discloses the technology of a management system implementing such an automation technology, wherein operation contents for a specific operation target apparatus (group) are divided into operation items and icons are allocated to the operation items and displayed.

CITATION LIST

Patent Literature

[PTL 1]
WO 2013/140609

SUMMARY OF INVENTION

Technical Problem

In PTL 1, the operation items are not generalized and hence the operation contents that can be automatically executed by a user are limited. As a result, user operation cost cannot be reduced.

Solution to Problem

A management system coupled to an operation target system including one or more operation target apparatuses is configured to: (1) manage a plurality of a component input properties and a plurality of components each including a processing content to be executed based on an input value that is input to the component input property of the component; (2) create or edit a service template that is associated with one or more components and an execution order and that includes one or more template input properties; (3) receive a designation of an template input property and an input value to be input to the template input property; (4) generate, based on the designated input value and the service template, an operation service for executing the processing content included in the component using the designated input value; and (5) execute the generated operation service to operate the operation target apparatus.

Advantageous Effects of Invention

The number of operation contents that are automatically executable by a user can be increased to reduce the operation cost for the user.

BRIEF DESCRIPTION OF DRAWINGS

FIG. 7 illustrates a configuration of a component property management table.
FIG. 8 illustrates a configuration of a service template (ST) management table.
FIG. 9 illustrates a configuration of a flow management table.
FIG. 10 illustrates a configuration of an ST property management table.
FIG. 11 illustrates a configuration of a service management table.
FIG. 12 illustrates a configuration of a service property setting table.

DESCRIPTION OF EMBODIMENTS

Figure 1:
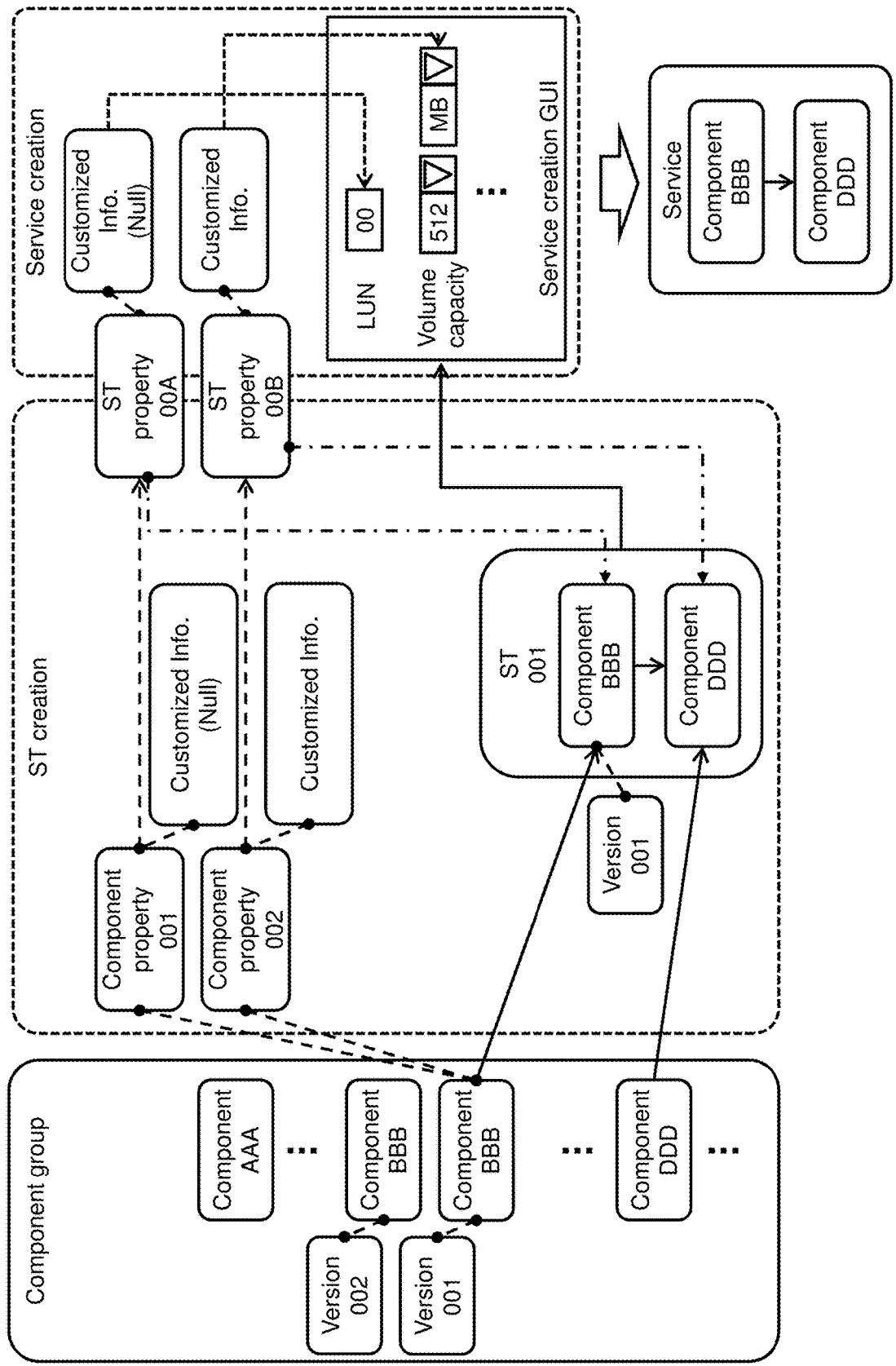
FIG. 1 illustrates a first overview of an embodiment.

One embodiment is now described. The embodiment described below is not intended to limit the invention in the claims, and not all of various elements and combinations thereof described in the embodiment are always necessary for the solution of the invention.

In the following description, information is sometimes described with the expression "kkk table". Information, however, may be expressed by another data configuration than the table. At least one of the "kkk tables" can be referred to as "kkk information" in order to indicate that the information is independent of the data configuration. The configuration of tables is illustrative. Two or more tables may be integrated into one table, or one table may be divided into a plurality of tables.

In the following description, processing is sometimes described with "program" as the subject. A program, however, is executed by a processor (such as central processing unit (CPU)) to implement predetermined processing with appropriate use of storage resources (such as memory) and/or a communication interface device (such as communication port). The subject of processing may therefore be a processor. Processing described with a program as the subject may be regarded as processing implemented by a processor or an apparatus including a processor. A processor may include a hardware circuit configured to implement a part or all of processing. A program may be installed to each controller from a program source. Examples of the program source include a program distribution computer or a computer readable storage medium.

The following embodiment includes a first management system (hereinafter referred to as "computer management system") configured to manage a computer system and a second management system (hereinafter referred to as "operation automation system") configured to support automation of system operations. The computer management system and the operation automation system may be a single management system. The computer management system may be included in an operation target apparatus.

In the following description, the management system may be configured by one or more computers. Specifically, for example, when a management computer displays information (specifically, when a management computer displays information on its own display device or a management computer transmits display information to a remote display computer), the management computer is a management system. For example, when similar functions to the management computer are implemented by a plurality of computers, the plurality of computers (may include a display computer when information is displayed on the display computer) are the management system. In this embodiment, a management server of an operation automation system is a management computer, and a management client of the operation automation system is a display computer.

The management computer includes an interface device coupled to an I/O system including a display system, a storage resource (for example, a memory) configured to store information therein, and a processor coupled to the interface device and the storage resource. The display system may be a display device included in the management computer or may be a display computer coupled to the management computer. The I/O system may be an I/O device (for example, a keyboard and a pointing device, or a touch panel) included in the management computer or may be a display computer or another computer coupled to the management computer. "Displaying display information" by the management computer refers to displaying display information on the display system, and this operation may be displaying display information on the display device included in the management computer or may be transmitting display information to the display computer from the management computer (in the latter case, display information is displayed by the display computer). Inputting and outputting information by the management computer may be inputting and outputting information via the I/O device included in the management computer or may be inputting and outputting information via a remote computer (for example, a display computer) coupled to the management computer. Outputting information may be displaying information.

In the following description, the expressions "uk (unique key)" and "key name" are used as element identification information. Other types of identification information (for example, number) may be used in place of or in addition to at least one of the "uk (unique key)" or the "key name".

Figure 2:
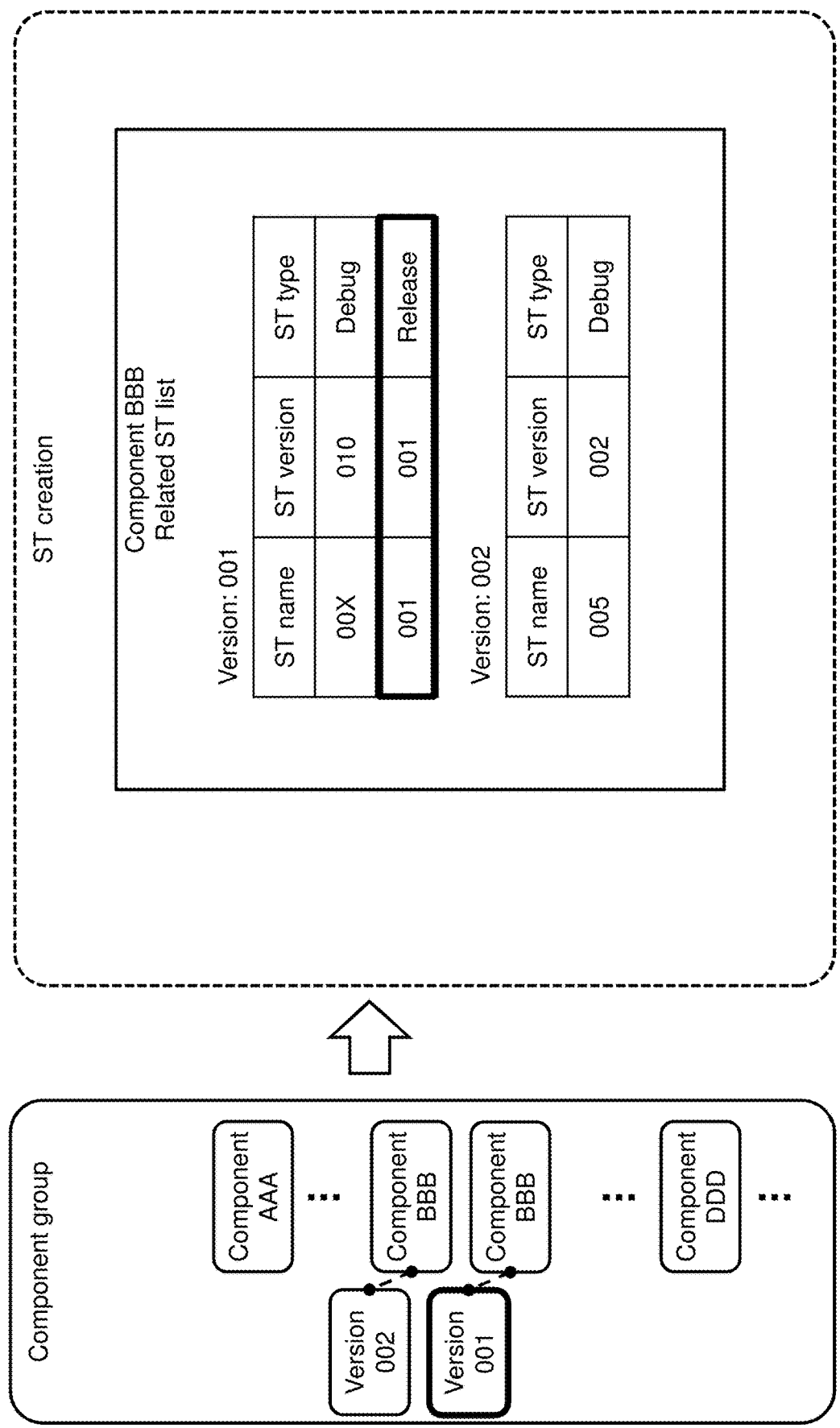
FIG. 2 illustrates a second overview of the embodiment.

FIG. 1 illustrates a first overview of the embodiment. FIG. 2 illustrates a second overview of the embodiment.

The operation automation system manages a large number of components for system operation. The "system operation" as used herein refers to operation of a computer system. The "component" is a part of the system operation, and is single independent processing (task). The component is, for example, a processing module for executing a script, and may be an executable file. Components are provided in the operation automation system in advance, but without being limited thereto, components may be added to the operation automation system later. A component may be, for example, a component for executing a configuration change of a storage apparatus (for example, a creation of a logical volume), but without being limited thereto, a component may be a component used to combine components or may be a general-purpose component. Examples of the components include a software component for repeated execution, a file transfer component, and a file executable component.

Possible cases include when a component (package) is downloaded and imported from outside the operation automation system, when a user of the operation automation system creates or improves a component, and when a service template is a component. Other than that, components may be imported by the operation automation system. As a component improvement example, at least one of the following is conceivable: (1) a bug fix in a component; (2) an improvement in internal processing efficiency; (3) a change in apparatus to be operated by a component (for example, the case where the specifications of a command for managing an apparatus have been changed and it becomes necessary to change a component that executes the command as well); (4) an increase in number of apparatuses to be operated by a component (for example, the case where a new second vendor apparatus in addition to a first vendor apparatus can now be operated); (5) a variation in number of input/output properties of a component; (6) a change in format of a value to be given to an input/output property of a component; (7) a change or addition of a default value with which a component is associated; or (8) an increase in number of processing contents of a component or an improvement in processing efficiency.

The operation automation system manages a large number of components (component group). In this embodiment, a service template (ST) is created based on two or more components among a large number of components, a service is created based on the created ST, and the created service is executed. Overviews of component management, ST creation, ST decision, service creation, and service execution are now described.

<Component Management>

The operation automation system manages a large number of components (component group). Components may be added or edited by a component providing user. The operation automation system manages, for each component, one or more component properties associated with the component. The operation automation system further manages, for each component, the versions of the component. FIG. 1 illustrates component properties and versions of a component BBB as an example, but other components are also associated with component properties and versions of the other components.

"Component property" is a property of a component. There are two types of the component properties: component input property and component output property. The component input property is a property that is related to the input of a value for a defined item (display name), and the component output property is a property that is related to the output of a value for a defined item (display name). Each component is associated with at least one of one or more component input properties or zero or more component output properties. In other words, some components are associated with zero output properties, but each component is associated with one or more input properties. For example, the input value may be a copy of a value that is input as a property of a service created in the past or may be a copy of a value that is output for another component already executed. The output value may be, for example, configuration information after a component is executed.

The component BBB with version 001 and the component BBB with version 002 are each managed. That is, even the same component is treated as different components as long as the "versions" are different. In other words, even when a component is updated (for example, improved), the updated component is not overwritten by the component before the update, but the updated component is managed separately from the component before the update. In updating a component, if the component before the update is automatically replaced with the updated component as represented by a so-called software update, a trouble may occur in operation automation. In particular, if the component before the update is an element of the service already created, a trouble may more easily occur. To address this, in this embodiment, when a component is updated, the operation automation system maintains a first type of identification information (for example, a component name) of the updated component to be the same as a first type of identification information of the component before the update, but changes at least one of the version or second identification information (for example, a component uk (component unique key)) of the updated component to be a different value from the version and second identification information of the component before the update. In this manner, the operation automation system can manage the updated component and the component before the update as separate components.

"Component providing user" is a user of the operation automation system who creates, adds, or updates components. The component providing user can create, add, or update components via, for example, a graphical user interface (GUI), a common language infrastructure (CLI), or an application programming interface (API).

<ST Creation>

The operation automation system displays an ST creation screen. An information input UI is displayed on the ST creation screen. An ST creating user inputs information on the ST creation screen through user operation. For example, the operation automation system receives a selection of two or more components among a large number of components and a designation of the execution order of the two or more components via the ST creation screen. The operation automation system creates a service template for a service flow based on the two or more selected components and the designated execution order.

"ST creating user" is a user who creates a service template. The ST creating user creates a service template by using the ST creation screen as described above. The ST creating user may be the same as or different from the component providing user. "User operation" is an operation performed on a screen by a user by using an input device. In general, the input device used for the user operation is a combination of a pointing device (for example, a mouse) and a keyboard, or a touch screen. The input via the screen is performed by the user operation.

"Service template" is a template of a service. In this embodiment, the service template is sometimes abbreviated as "ST".

"Service flow" is typically a sequence of two or more selected components. The sequence of the components follows the designated execution order. When the number of selected components is only one, the number of components constituting a service flow is also one.

As described above, the operation automation system creates a service template based on two or more components and their execution order that are selected and designated via the ST creation screen. Specifically, for example, the operation automation system creates a plurality of ST properties (for example, ST properties 00A and 00B) respectively corresponding to a plurality of component properties (for example, component properties 001 and 002) associated with two or more selected components, and associates the plurality of created ST properties with a service template (for example, ST001). The ST properties corresponding to the component properties are automatically created by the operation automation system based on the corresponding component property. The ST property may include a value that is input by the user operation during or after the creation of the ST property, but the ST property may be created without any input by the user operation (that is, manual input). "ST property" is the property of an ST. The ST property has two types: ST input property and ST output property. The ST input property is a property that is related to the input of a value for a defined item (display name), and the ST output property is a property that is related to the output of a value for a defined item (display name). Each service template is associated with at least one of one or more ST input properties or zero or more ST output properties. In other words, there is not always one ST output property.

In the example of FIG. 1, the service flow is a combination of the component BBB "Provisioning volume" (to create a logical volume in storage apparatus) and the component DDD "Create pair volume" (to create a logical volume (secondary volume) to be paired with the logical volume (primary volume)). Then, the service template (ST001) for the service flow is created.

<ST Decision>

When the operation automation system receives a decision of a created service template through user operation, the operation automation system manages the ST type of the created service template as "Release" (see FIG. 2). The ST type "Release" means that the service template is decided and a service can be created based on the service template. On the other hand, a service template which has not been decided has the ST type "Debug". The ST type "Debug" means that the service template is being edited. Note that the operation automation system may be configured not to receive a selection of a service template whose ST type is "Debug" in the execution of a service (for example, a service template whose ST type is "Debug" is not displayed in a selectable manner (disabled)). As an example, a service creating user to be described later may be allowed to create a service from only a service template whose ST type is "Release", and the service template creating user may be allowed to create a service from both of a service template whose ST type is "Release" and a service template whose ST type is "Debug" for test purposes. It should be understood that the operation automation system recognizes users in order to implement such processing.

<Service Creation>

The operation automation system manages the created service template. The operation automation system receives a selection of any one of the service templates with the ST type "Release" from the service creating user, and displays a service creation screen on the basis of the selected service template. The service creating user inputs information on the service creation screen through the user operation. The operation automation system creates a service on the basis of the information input via the service creation screen.

"Service creating user" is a user who creates (executes) a service. The service creating user and the ST creating user may be different users or may be the same user.

"Service" is an instantiated service template. Specifically, the value necessary to execute a service is left blank in the service template, and when the necessary value is input to the service template, a service is created. Note that the value necessary to execute a service may be set as information whose default value is an ST property.

Note that the service is sometimes referred to as "operation service" in order to express that the service relates to operation. Note that the "service" in a specific situation can be regarded as representing operation processing to be executed on an operation target apparatus designated by a user. For example, this expression corresponds to when an ST input property 1304C is designated in the example of FIG. 13. In a case where an operation target apparatus to be designated is embedded in a component itself or a default value is not given to an input property of a component, the relation between "service" and "service template" can be regarded in the following another viewpoint. With the processing contents represented by "service", the operation target apparatus to be subjected to a configuration change or designated as an information acquisition source is clear because the input value is defined. However, the operation target apparatus to be designated is unclear with the "service template".

Note that the operation automation system may associate a service property with a created service. "Service property" is an input/output property (property for at least one of input or output) of the service. At least one of the value that is input to the service template in the service creation or the value that is output from the component in the service execution is set to the input/output property of the service. Specifically, for example, in the service execution, the value that is input to the input property in the service creation may be input to the component associated with the service template of the service, thereby executing processing. Further, the value output from the component may be set to the output property of the service so that the set value (for example, configuration information after the component is executed) is displayed on a service execution result screen.

<Service Execution>

The operation automation system transmits an instruction to execute a created service to the computer management system. The computer management system executes the service in accordance with the instruction.

The above description is the overviews of the component management, the ST creation, the service creation, and the service execution.

Each of at least one ST input property among a plurality of ST properties is associated with customized UI generation information, which is information that defines a customized UI. Note that the customized UI generation information for a default UI is "Null" (information for default UI). A customized UI and a default UI are described later. In the drawings, the "customized UI generation information" is sometimes abbreviated as "customized Info.". The customized UI generation information of the ST property is UI generation information that is associated with a component property corresponding to the ST property (for example, information including information necessary to generate a UI). Each of at least one component input property among a plurality of component properties may be associated with customized UI generation information.

The operation automation system can display the screens, such as the ST creation screen and the service creation screen, in a sequential manner. A UI is displayed on at least one screen. In this embodiment, a UI is one element displayed on the screen. The screen including one or more UIs can be referred to also as "GUI". Note that a UI is sometimes referred to as "UI element" in the following description.

<Generation and Display of UI>

In this embodiment, the operation automation system generates a UI to be displayed on at least the service creation screen in the following manner, for example.

Specifically, the operation automation system generates a plurality of UIs based on a plurality of pieces of customized UI generation information respectively corresponding to a plurality of ST properties of the selected service template. The operation automation system displays the plurality of generated UIs on one service creation screen. In this embodiment, one UI is generated based on one customized UI generation information. In other words, the customized UI generation information and the UI have a 1:1 relation. The relation between the customized UI generation information and the UI, however, may be n:1, 1:n, or m:n (m and n are integers of 2 or more).

According to such UI generation, for example, even when a component DDD is replaced with a component EEE in a service flow constituted by a component BBB and the component DDD, a UI for the component EEE is generated and displayed in place of a UI for the component DDD as the UI to be displayed on the service creation screen after the replacement of components. As described above, UIs are generated with efficiency.

<Customized UI>

In this embodiment, a customized UI is prepared as a UI in place of or in addition to the default UI.

"Default UI" is a key-value UI with a text field. Specifically, the default UI is a pair of the display name of an ST property (component property) and a text field. Note that the reason why a text field is employed in the default UI is that the text field supports a wide variety of input forms. A text field is displayed irrespective of the display name (input item) of the ST property (component property). A user therefore needs to consider information such as the value or name to be input by looking at the display name, and needs to input the information in the text field by typing keys. Accordingly, an erroneous input, such as a typo, may occur. Even when a value, name or the like is invalid for an ST property (component property), such an invalid value, name or the like may be input. Users may be required to have advanced knowledge.

In contrast, "Customized UI" is a UI that takes usability into consideration rather than a key-value UI with a text field. For example, the customized UI is a UI including one or more GUI elements (widgets), such as at least one of the display name of an ST property (component property), a pull-down menu, a checkbox, or a radio button. Therefore, an erroneous input less often occurs with the customized UI than the default UI, and the user is not required to have advanced knowledge. Note that the customized UI may include a text field as well, but the customized UI is a UI with higher usability (for example, a UI including a list of invalid values, names or the like that is displayed close to a text field) than a UI such as the default UI (a key-value UI with a text field).

According to the example in FIG. 1, a default UI (a set of the display name: LUN and the text field) and a customized UI (a set of the display name: Volume Capacity, a pull-down menu for the volume capacity, and a pull-down menu for the unit of the volume capacity (for example, megabytes (MB))) are mixed in the single service creation screen.

As described above, in this embodiment, not all of the UIs are required to be customized UIs. Even when a component that is not associated with a customized UI and a component that is associated with a customized UI are mixed in a single service flow, a customized UI as well as a default UI is displayed on the service creation screen as defined. There is a large number of components for system operation, and hence if components are provided after all UIs are changed to customized UIs, it takes time for a vendor of the operation automation system to provide its own product. According to this embodiment, even when a component that is not associated with customized UI generation information for a customized UI is early provided or when the ST creating user creates a component on his/her own and embeds the component in a service template, the service creating user can benefit a customized UI in the service creation.

Note that even when a customized UI is added to a component property (ST property) or when an old customized UI is changed to a new customized UI, the UI before the change (that is, the default UI or the old customized UI) is displayed on the screen. Specifically, for example, when the operation automation system receives a request to change the UI of the component associated with the existing ST, the operation automation system creates a copy of the component for which the UI change request has been received (creates a new component with a different version based on the existing component), and creates a component whose UI has been changed. Next, the operation automation system creates a copy of the existing ST (creates a new ST with a different version based on the existing ST), and replaces the existing component with a new component whose version is different from that of the existing component, in the created new ST. If the UI that is associated with the component used for the existing ST is automatically changed, the ST that has originally functioned well may no longer be used (for example, a value that has originally been successfully input can no longer be input). According to this embodiment, the UIs of the component can be replaced without adversely affecting a usable ST.

Even when a UI that is associated with a component property of a component associated with a created service template is changed and a new component is added, the operation automation system uses the existing component to display the UI before the change on the service creation screen based on the service template. In this manner, it is possible to avoid a situation in which a value that has originally been successfully input can no longer be input due to the change of the related UI after the creation of the service template. A specific example of generating a UI before change and maintaining display of this UI is described later with reference to FIG. 26.

<Display of Component Version and Related ST>

As described above with reference to FIG. 1, the operation automation system manages the relation between the version of a component and a service template (related ST) associated with the component of this version. During the creation of a service or before the start of creating a service, when the operation automation system receives a selection of a component (for example, the component BBB) from the user, the operation automation system displays a related ST list for each version of the selected component as illustrated in FIG. 2. The related ST list has related ST information (for example, the ST name, the ST version, and the ST type) for each related ST. In this manner, at least one of the following features (A) and (B) can be implemented.

(A) When an updated component is imported, the user can select a component before the update to know whether the component before the update has a related ST or not based on the related ST list for each version of the component before the update. Further, when the component before the update has a related ST, the user can know the ST type of the related ST as well. The user can determine whether or not to replace the component associated with the existing service template with the updated component based on the presence/absence of the related ST and the ST type. For example, when no related ST is present for the component before the update, the user can determine that it is unnecessary to replace the component associated with the ST with the updated component. For example, when a related ST whose ST type is "Release" is present for the component before the update (for example, the component BBB with version 001), the user can determine that a trouble may occur if the component before the update associated with the related ST is replaced with the updated component, and that it is therefore necessary to create a new ST by replacing the component before the update with the updated component. For example, when a related ST is present for the component before the update but a related ST whose ST type is "Release" is absent (for example, the component BBB with version 002), the user can determine that the component before the update associated with the related ST can be replaced with the updated component.

(B) The user can know, based on a related ST list for each version of a selected component (for example, the component BBB), the presence/absence of a related ST for the selected component and the ST type of the related ST. The user can determine, based on the presence/absence of a related ST and the ST type, the influence caused by updating the selected component (for example, the necessity of preparing a component with a new version, the necessity of replacing a component that is associated with a related ST, or the necessity of creating a new ST). For example, when a related ST whose ST type is "Release" is absent for the selected component, the user can determine that the selected component can be updated without changing the version of the component (that is, the component itself may be replaced without adding a component with a different version). Further, for example, when a related ST whose ST type is "Release" is present for the selected component, the user can determine that a component having a new version for the selected component needs to be prepared as the updated component.

It is generally desired to prevent, even when a component is updated (the version is upgraded), a component that is associated with the decided service template from being replaced with the updated component. According to this embodiment, as described above, a list representing which service template the component of each version is associated with is displayed. Consequently, it becomes easy to determine a service template which is associated with a component that is required to be replaced with the updated component or a component that is prevented from being replaced with the updated component.

The overview of the embodiment has been described above. The embodiment is now described in detail.

Figure 3:
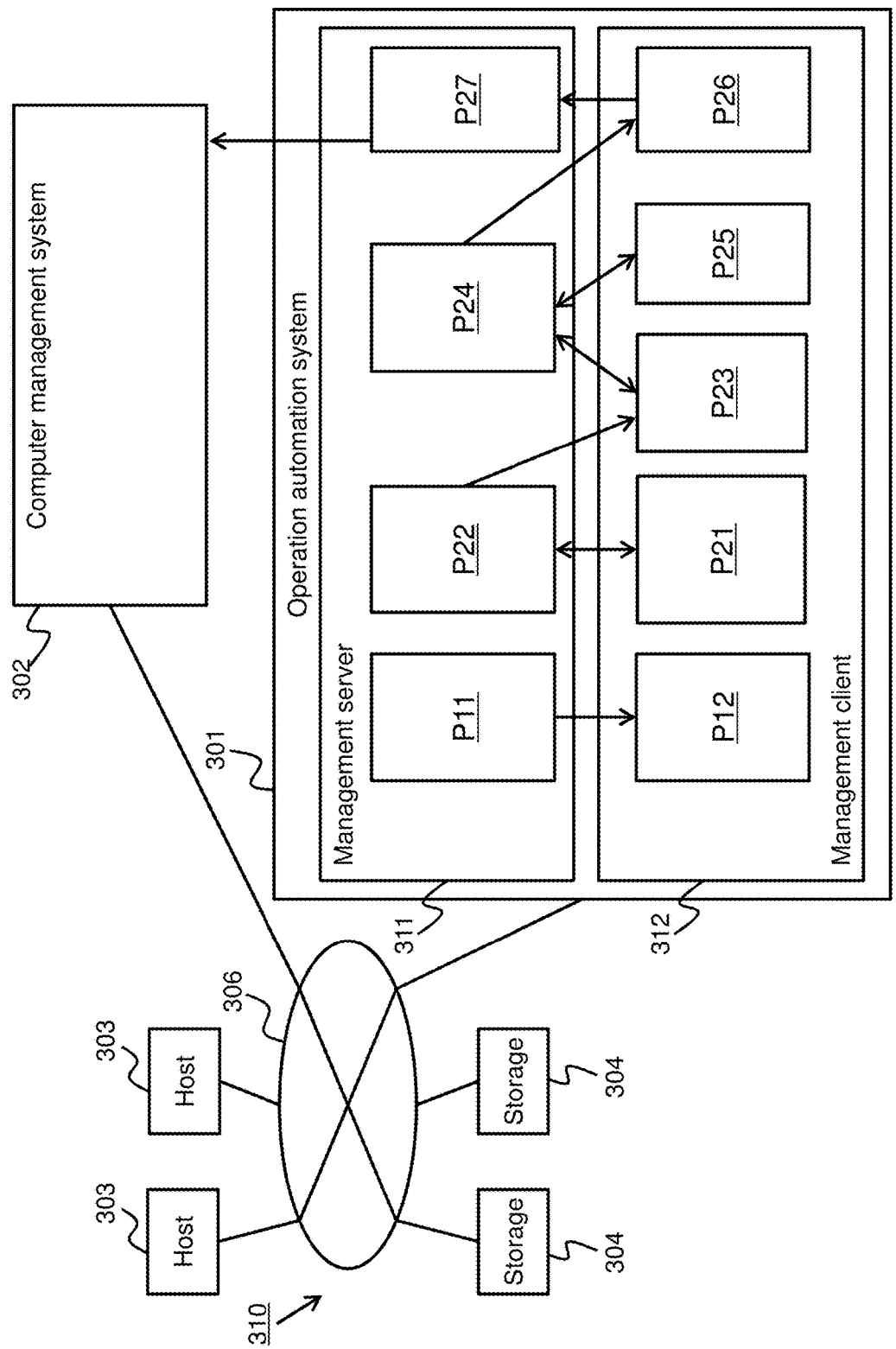
FIG. 3 illustrates a configuration of an overall system according to the embodiment.

FIG. 3 illustrates the configuration of the overall system according to the embodiment.

A computer management system 302 is coupled to a computer system 310. An operation automation system 301 is coupled to the computer management system 302. The operation automation system 301 may be integrated with the computer management system 302.

The computer system 310 includes one or more host computers (hereinafter referred to as "hosts") 303 and one or more storage apparatuses 304. The hosts 303 and the storage apparatuses 304 are coupled to one another via a communication network 306. Each host 303 includes a communication interface device (I/F) coupled to the storage apparatuses 304, a storage resource such as a memory, and a processor coupled to the I/F and the storage resource. Each storage apparatus 304 includes one or more physical storage devices (PDEVs) and a controller coupled to the one or more PDEVs. The controller provides a logical volume to the host 303. The host 303 transmits an input/output (I/O) request for designating the provided logical volume to the storage apparatus 304. The controller in the storage apparatus 304 inputs and outputs data to and from the logical volume in accordance with the I/O request. Data to be input and output is input and output to and from one or more PDEVs that are the base of the I/O destination area of the logical volume. Note that the host 303 and the storage apparatus 304 are an example of an operation target apparatus.

The computer management system 302 is a management system configured to manage the computer system 310. The computer management system 302 executes a service in accordance with an instruction from the operation automation system 301. Examples of the execution of the service include creation of a logical volume in the storage apparatus 304 and creating a secondary volume in the storage apparatus 304.

The operation automation system 301 is a management system configured to support automation of system operation. The operation automation system 301 includes a management server 311 and a management client coupled to the management server 311. The management client 312 displays information on the basis of display information transmitted from the management server 311 to the management client 312. In other words, the management server 311 displays information via the management client 312.

Specifically, for example, the management server 311 specifies a relation between the component and the related ST (P11), and displays a related ST list for each version of the component (P12).

For example, the management server 311 displays an ST creation screen (P21), and receives a creation (including an editing) of an ST from the ST creating user via the ST creation screen (P22). The management server 311 displays a service creation screen based on the decided ST (P23). The management server 311 receives information from the service creating user via the service creation screen, and creates and holds a service based on the input information (P24). The management server 311 may display a screen for editing the service (P25) so as to receive an editing of the service. The management server 311 displays an execution screen for the created (including edited) service (P26). The management server 311 receives an execution of the service from the service creating user via the service execution screen, and transmits the received instruction to execute the service to the computer management system 302 (P27).

Processing groups of processing P11, P12 and P21 to P 27 (one or more processing) illustrated in FIG. 3 are implemented by a processor executing a program group (one or more computer programs).

Figure 4:
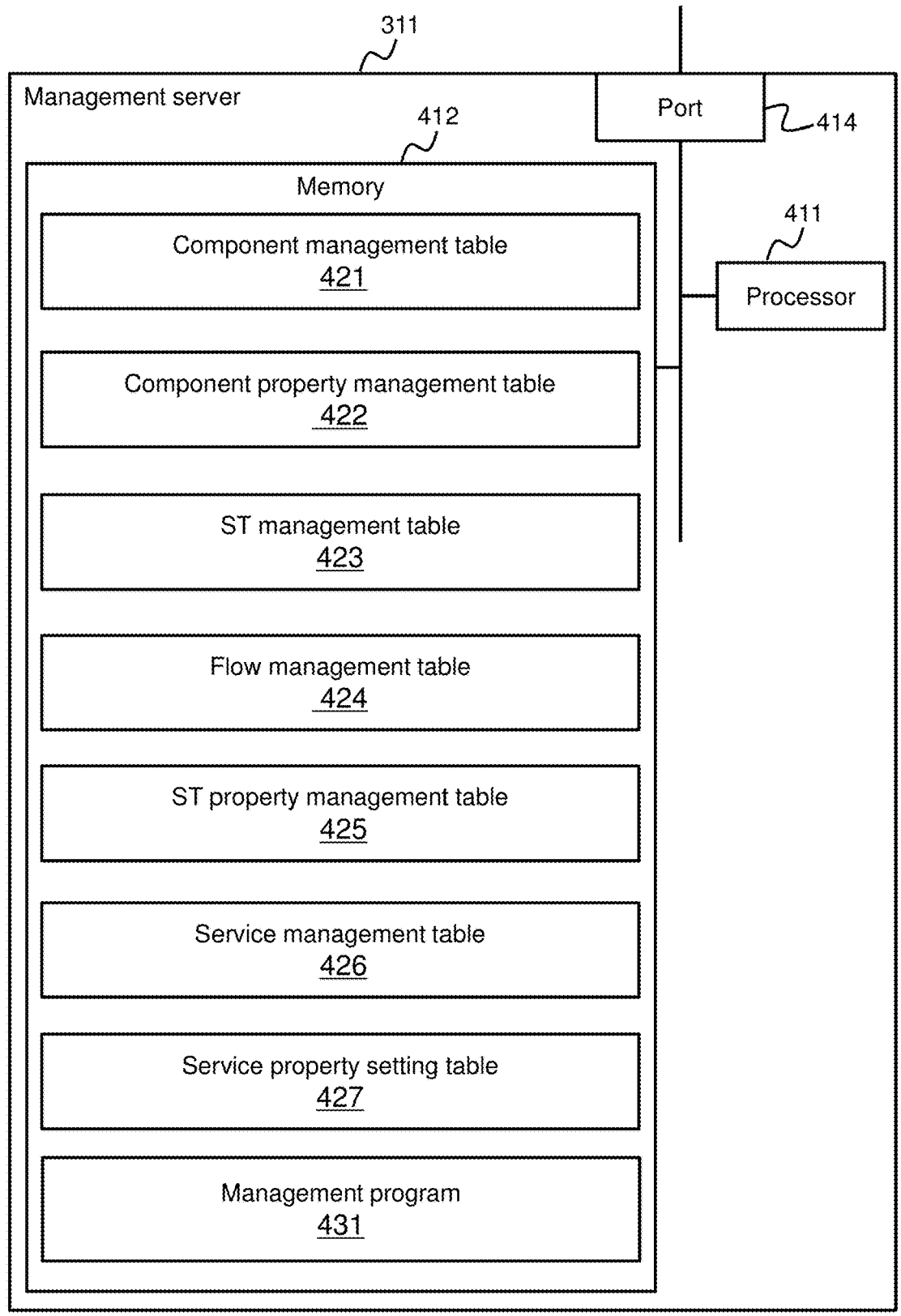
FIG. 4 illustrates a configuration of a management server.

FIG. 4 illustrates the configuration of the management server 311.

The management server 311 includes a communication port 414 (example of I/F), a memory 412 (example of storage resource), and a processor (typically, microprocessor such as CPU) 411 coupled to the communication port 414 and the memory 412. The management server 311 communicates with at least the computer management system 302 and the management client 312 via the communication port 414.

The memory 412 is not limited to a semiconductor memory and may be a hard disk drive. The memory 412 stores a computer program and a management table. Specifically, for example, the memory 412 stores a component management table 421, a component property management table 422, an ST management table 423, a flow management table 424, an ST property management table 425, a service management table 426, a service property setting table 427, and a management program 431. The management program 431 is executed by the processor 411 to perform the processing P11, P12, P24, and P27 illustrated in FIG. 3, for example.

Figures 5, 6:
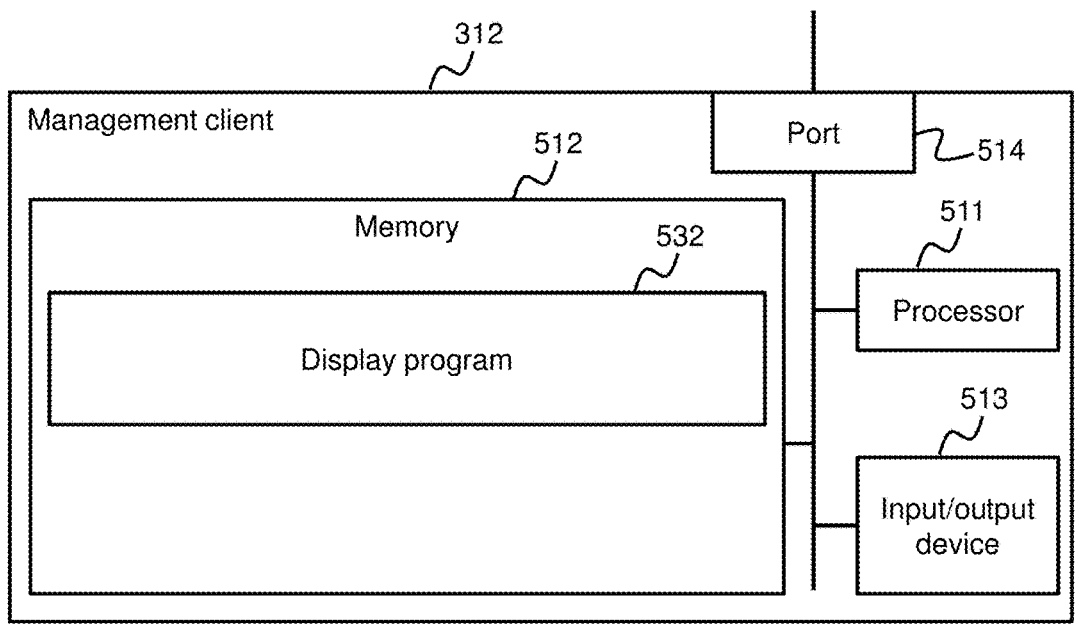
FIG. 5 illustrates a configuration of a management client.
FIG. 6 illustrates a configuration of a component management table.

FIG. 5 illustrates the configuration of the management client 312.

The management client 312 includes a communication port 514 (example of I/F), an input/output device 513, a memory 512 (example of storage resource), and a processor (typically, microprocessor such as CPU) 511 coupled to the communication port 514, the input/output device 513, and the memory 512.

The memory 512 is not limited to a semiconductor memory and may be a hard disk drive. The memory 512 stores a display program 531. The display program 531 is executed by the processor 511 to perform the processing P12, P21, P23, P25, and P26 illustrated in FIG. 3, for example.

The configuration of management information (tables 421 to 427) in the management server 311 is now described.

FIG. 6 illustrates the configuration of the component management table 421.

The component management table 421 has information related to components. The component management table 421 has a record for each component. A management number 601, a component name 602, a version 603, an executable file path 604, and a component uk 605 are stored in each record. The management number 601 is a serial number of the record. The component name 602 is the name of the component. The version 603 represents the version of the component. The executable file path 604 represents a path (path name) to the executable file of the component. The component uk 605 is a unique key (number) of the component. The uk is an example of identification information.

As understood from FIG. 6, the same components with different versions have the same component name 602 (for example, "Provisioning Volume") and different versions 603 (for example, "01.00.00" and "01.10.00"). In other words, the same components with different versions are managed as separate components. It is also understood that a plurality of components having the same component name 602 have the same original.

FIG. 7 illustrates the configuration of the component property management table 422.

The component property management table 422 has information related to component properties. The component property management table 422 has a record for each component property. A management number 701, a component uk 702, a display name 703, a key name 704, an initial value 705, an input/output type 706, a property group 707, and customized UI generation information 708 are stored in each record.

The management number 701 is a serial number of the record. The component uk 702 is a unique key of the component. The display name 703 is a component property name displayed on the screen, and corresponds to, for example, an input item or an output item.

The key name 704 is the name for uniquely identifying the component property, and is an example of identification information of the component property. The initial value 705 is a value to be set to a generated UI in advance. "Null" in the initial value 705 means that no initial value is present. In other words, when a UI is displayed, the input field or the output field is blank.

The input/output type 706 is information for distinguishing whether the component property is a component input property or a component output property (that is, whether the value on the UI is an input value or an output value). The value in the input/output type 706 is "In" when the corresponding component property is a component input property, and is "Out" when the corresponding component property is a component output property.

The property group 707 represents the name of a property group to which the component property belongs. Specifically, in this embodiment, at least one property group is present, and at least one of one or more component properties or one or more ST properties (for example, one or more ST properties respectively corresponding to the one or more component properties) are associated with the property group. The value "Null" in the property group 707 means that the corresponding component property does not belong to any property group.

The customized UI generation information 708 represents the type of a customized UI to be generated. The value "Null" in the customized UI generation information 708 means that the customized UI generation information is information for a default UI.

FIG. 8 illustrates the configuration of the ST management table 423.

The ST management table 423 has information related to service templates. The ST management table 423 has a record for each ST. A management number 801, an ST name 802, an ST version 803, an ST uk 804, a flow uk 805, and an ST type 806 are stored in each record.

The management number 801 is a serial number of the record. The ST name 802 is the name of the service template. The ST version 803 is a version of the service template. The ST uk 804 is a unique key of the service template. The flow uk 805 is a uk of a service flow corresponding to the service template. The ST type 806 represents the type of the service template. The value "Debug" in the ST type 806 means that the service template is editable, and the value "Release" in the ST type 806 means that the service template is decided (not editable).

As understood from FIG. 8, the same STs with different versions have the same ST name 802 (for example, "Provisioning & Pair") and different ST versions 803 (for example, "01.00.00" and "01.10.00"). In other words, the same STs with different ST versions are managed as separate STs. It is also understood that a plurality of STs having the same ST name 802 have the same original.

As described above, the versions of the component associated with the ST can be replaced with each other (that is, the component can be updated) when the ST with which the component is associated is undecided (Debug). In order to avoid a confusion caused by editing an ST that has already been present as a service (for example, an influence on a component associated with the ST), the management program 431 in this embodiment prohibits the decided ST (an ST whose ST type is "Release") from being returned to the editing status (Debug). When a request to edit the decided ST is received from the user, the management program 431 generates a copy of the decided ST, and displays the ST copy as an ST to be edited. As a modification, the management program 431 may permit even the decided ST from being returned to the editing status as long as there is no service in execution or in an execution queue (for example, as long as a service is not being created or has been created based on the ST), and may prohibit the decided ST from being returned to the editing status when the ST is decided and there is any service in execution or in an execution queue.

FIG. 9 illustrates the configuration of the flow management table 424.

The flow management table 424 has information related to service flows. The flow management table 424 has a record for each service flow. A management number 901, a flow uk 902, a component uk list 903, and a property mapping list 904 are stored in each record.

The management number 901 is a serial number of the record. The flow uk 902 is a unique key (number) of the flow.

The component uk list 903 is a list of uks of components constituting the service flow. In the component uk list 903, component uks are arranged in the order of arrangement of components in the service flow (in the execution order of the components).

The property mapping list 904 is a list of uks of service properties of a service corresponding to the service flow. In the list 904, the uk of the service property is, for example, a combination of the component uk and the key name of the component. Note that a combination of the component properties of the component uks, such as "{component uk(1).storage.pathinfo=component uk(2).storage.pathinfo}", means that an output value from one component is an input value to the other component.

FIG. 10 illustrates the configuration of the ST property management table 425.

The ST property management table 425 has information related to ST properties. The ST property management table 425 has a record for each ST property. A management number 1001, an ST uk 1002, an ST property uk 1003, a display name 1004, a key name 1005, an input/output type 1006, a property group 1007, and customized UI generation information 1008 are stored in each record.

The management number 1001 is a serial number of the record. The ST uk 1002 is an ST uk of an ST with which the ST property is associated.

The ST property uk 1003 is a unique key (for example, a number) of the ST property.

The display name 1004 is an ST property name to be displayed on the screen. The key name 1005 is the name for uniquely identifying the ST property, and is an example of identification information of the ST property.

The input/output type 1006 is information for distinguishing whether the ST property is an ST input property or an ST output property (that is, whether the value on the UI is an input value or an output value). The value in the input/output type 1006 is "In" when the corresponding ST property is an ST input property, and is "Out" when the corresponding ST property is an ST output property.

The property group 1007 represents the name of a property group to which the ST property belongs. Specifically, as described above, in this embodiment, at least one property group including Null described later is present, and at least one of one or more component properties or one or more ST properties are associated with the property group. The value "Null in the property group 1007 means that the corresponding ST property does not belong to any property group.

The customized UI generation information 1008 represents the type of a customized UI to be generated. The value "Null" in the customized UI generation information 1008 means that a default UI is associated with the corresponding ST property. Note that the customized UI generation information may include customized UI generation detailed information (for example, the number of widgets, the type of each widget, texts to be displayed, and a list to be displayed). The customized UI generation detailed information (not shown) may be associated with an ST property. A customized UI may be generated based on the customized UI generation detailed information associated with the ST property.

FIG. 11 illustrates the configuration of the service management table 426.

The service management table 426 has information related to services. The service management table 426 has a record for each service. A management number 1101, a service name 1102, a service explanation 1103, an ST uk 1104, and a service uk 1105 are stored in each record.

The management number 901 is a serial number of the record. The service name 1102 is the name of the service. The service explanation 1103 is an explanation of the service, and may include, for example, processing in the service and the order of the processing. The ST uk 1104 is an ST uk of an ST corresponding to the service. The service uk 1105 is a unique key (number) of the service.

FIG. 12 illustrates the configuration of the service property setting table 427.

The service property setting table 427 has information related to service properties. The service property setting table 427 has a record for each service property. A management number 1201, a property set value 1202, an ST property uk 1203, and a service uk 1204 are stored in each record.

The management number 1201 is a serial number of the record. The property set value 1202 is an input value (or an output value) of the corresponding ST property. "Null" means that no input value (or output value) is present. The ST property uk 1203 is an ST property uk of the corresponding ST property. The service uk 1204 is a service uk of the corresponding service.

It is understood from FIG. 12 that five ST properties are associated with the service whose service uk is "1", and the values such as "STORAGEHOST" and "1" are input (or output) to (or from) five UIs (at least one of a default UI or a customized UI) respectively corresponding to the five ST properties.

The above description is the configurations of the tables 421 to 427. Note that, in the above description, the identification information such as the display name, the key name, and the uk may be information input by the user or information determined by the management program 431.

An example of the detailed relation between the ST input property and the ST output property and an example of detailed UI generation/display are now each described.

Figure 13:
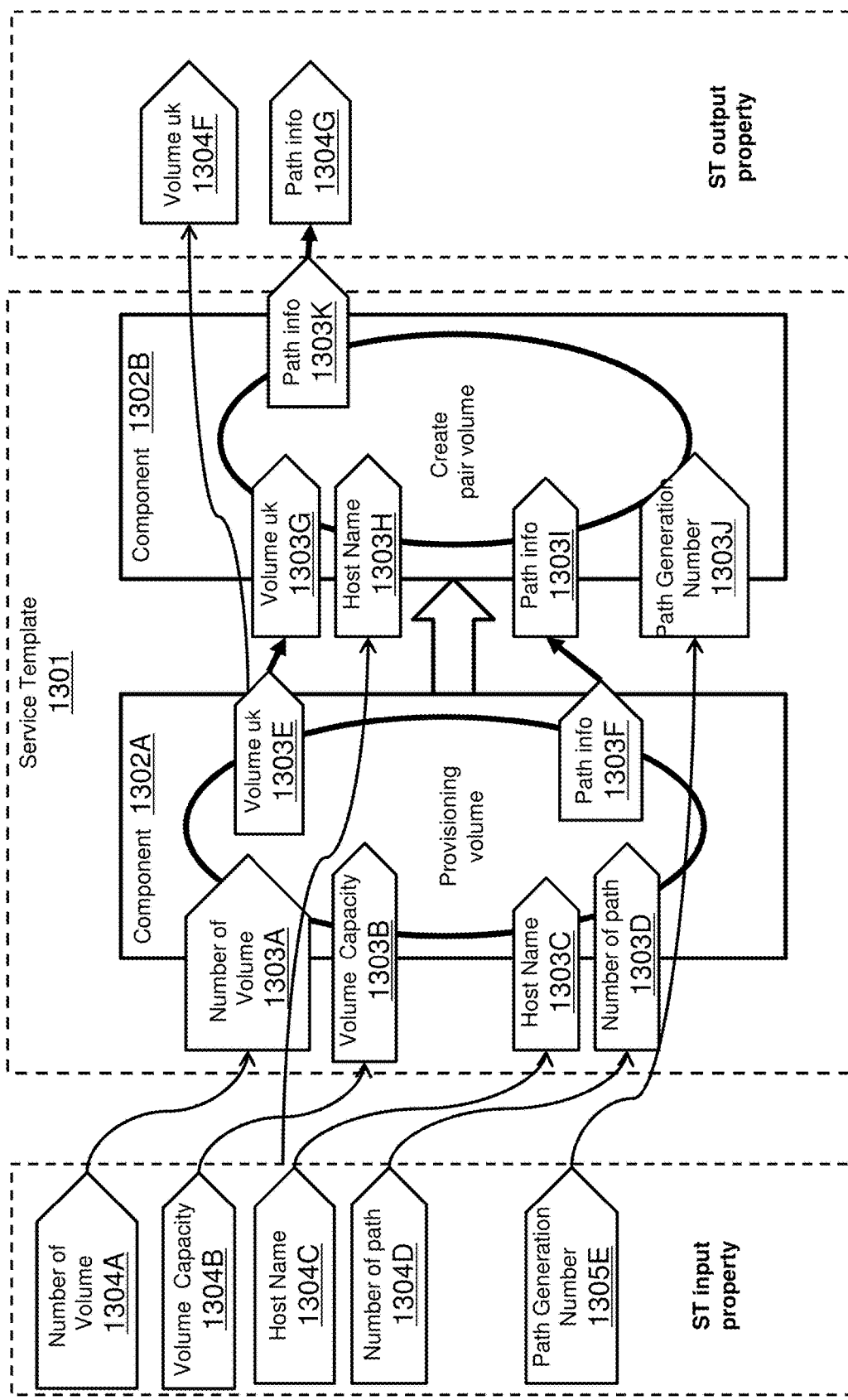
FIG. 13 illustrates an example of a relation between an ST input property and an ST output property.

FIG. 13 illustrates an example of the relation between the ST input property and the ST output property.

A service flow corresponding to a service template 1301 is constituted by a component 1302A ("Provisioning Volume") and a component 1302B ("Create pair volume"). The service flow has the execution order in which the component 1302B is executed next to the component 1302A.

The component 1302A is associated with four component input properties 1303A to 1303D. The display names of the four component input properties 1303A to 1303D are "Number of Volume", "Volume Capacity", "Host Name", and "Number of path", respectively. The component 1302A is associated with two component output properties 1303E and 1303F. The display names of the two component output properties 1303E and 1303F are "Volume uk" and "Path info", respectively.

The component 1302B is associated with four component input properties 1303G to 1303J. The display names of the four component input properties 1303G to 1303J are "Volume uk", "Host Name", "Path info", and "Path Generation Number", respectively. The component 1302B is associated with one component output property 1303K. The display name of the component output property 1303K is "Path info".

Of those component properties, the component output property 1303E whose display name is "Volume uk" and the component input property 1303G whose display name is the same "Volume uk" have the same key name. Similarly, the component output property 1303F whose display name is "Path info" and the component input property 1303I whose display name is the same "Path info" also have the same key name. Accordingly, the output value from the component output property 1303E is used as the input value of the component input property 1303G, and the output value from the component output property 1303F is used as the input value of the component input property 1303I. For "Volume uk" and "Path info", the output values are used directly as the input values in this manner, and hence the ST creating user is not required to input the values for "Volume uk" and "Path info". Consequently, an erroneous input can be prevented.

The service template 1301 for the service flow including the components described above is associated with ST input properties 1304A to 1304E and ST output properties 1304F and 1304G by the management program 431. The ST input property 1304A is an ST input property generated based on the component input property 1303A, and accordingly the display name thereof is "Number of Volume". The ST input property 1304B is an ST input property generated based on the component input property 1303B, and accordingly the display name thereof is "Volume Capacity". The ST input property 1304C is an ST input property generated based on the component input properties 1303C and 1303H, and accordingly the display name thereof is "Host Name". The ST input property 1304D is an ST input property generated based on the component input property 1303D, and accordingly the display name thereof is "Number of path". The ST input property 1304E is an ST input property generated based on the component input property 1303J, and accordingly the display name thereof is "Path Generation Number". The ST output property 1304F is an ST input property generated based on the component output property 1303E, and accordingly the display name thereof is "Volume uk". The ST output property 1304G is an ST input property generated based on the component output property 1303K, and accordingly the display name thereof is "Path info". Those ST input properties and ST output properties are generated by the management program 431 based on the component input properties and the component output properties.

Figure 14:
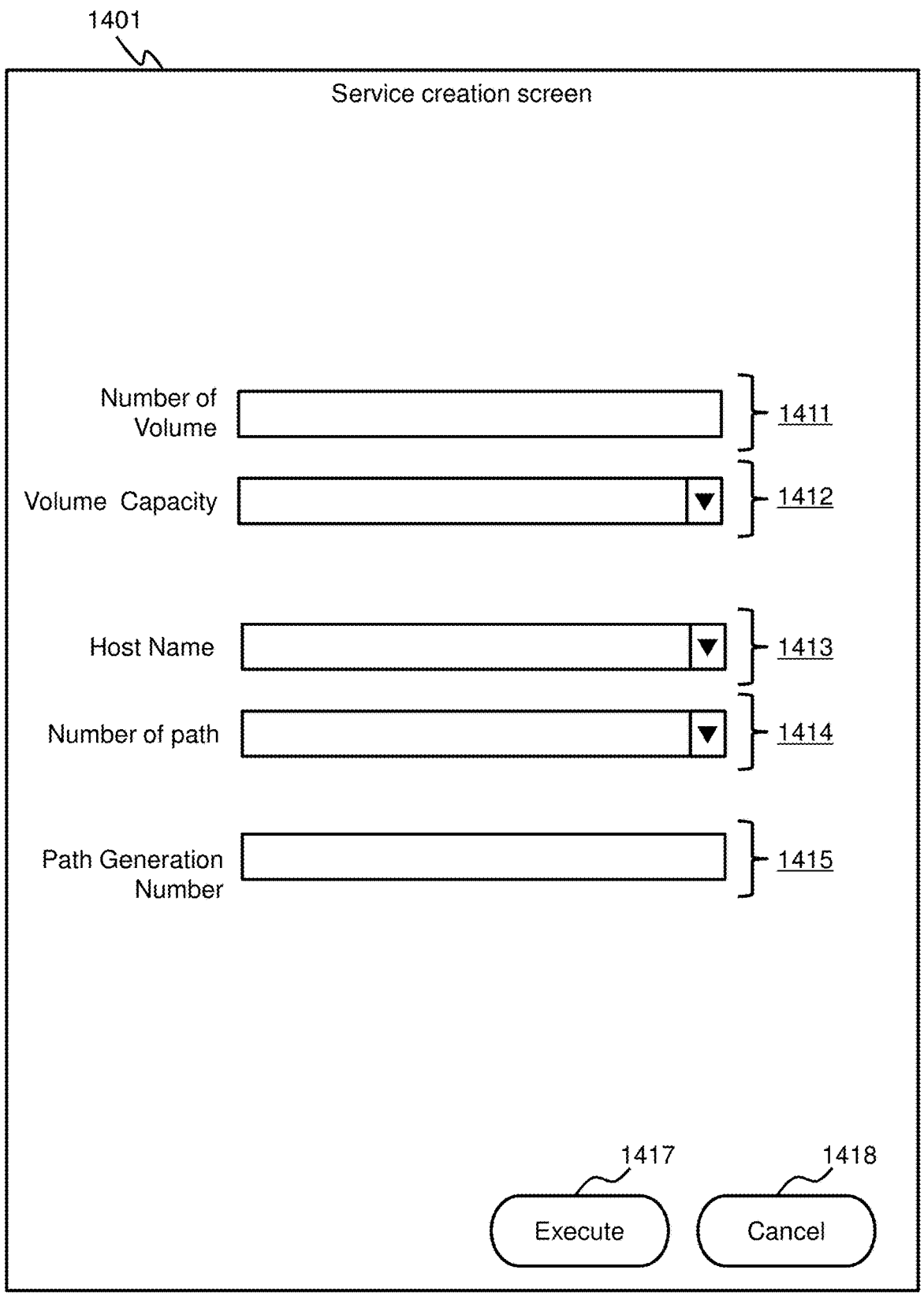
FIG. 14 is an example of a service creation screen corresponding to an ST in FIG. 13.

FIG. 14 is an example of the service creation screen corresponding to the ST in FIG. 13.

On a service creation screen 1401, UIs 1411 to 1415 respectively corresponding to the ST input properties 1304A to 1304E are displayed. Each of the UIs 1411 to 1415 is a UI generated by the management program 431. Of the UIs 1411 to 1415, the UIs 1411 and 1415 are default UIs and the UIs 1412 to 1414 are customized UIs. Each of the UIs 1411 to 1415 is generated based on customized UI generation information associated with the corresponding ST input property.

The service creation screen 1401 is provided with an execution button 1417 and a cancel button 1418. The ST creating user presses the execution button 1417 after confirming the values input to the UIs 1411 to 1415. In response thereto, a service is created based on the input values, and an instruction to execute the service is transmitted to the computer management system 302. For canceling the values input to the UIs 1411 to 1415, the ST creating user presses the cancel button 1418 so that all the UIs 1411 to 1415 become blank.

Note that whether the UI displayed on the service creation screen 1401 is a default UI or a customized UI depends on the customized UI generation information associated with the ST property of the ST, and hence all of the UIs displayed on the screen 1401 may be customized UIs.

Based on property groups to which the ST input properties 1304A to 1304E respectively belong, the management program 431 may display UIs for each property group. For example, two or more UIs belonging to the same property group may be surrounded by one frame. When ST properties in the same field belong to the same property group, UIs for the ST properties are arranged correspondingly to the property group. An improvement in visibility is expected by this arrangement.

Specific examples of the display in this embodiment are now described.

Figure 15:
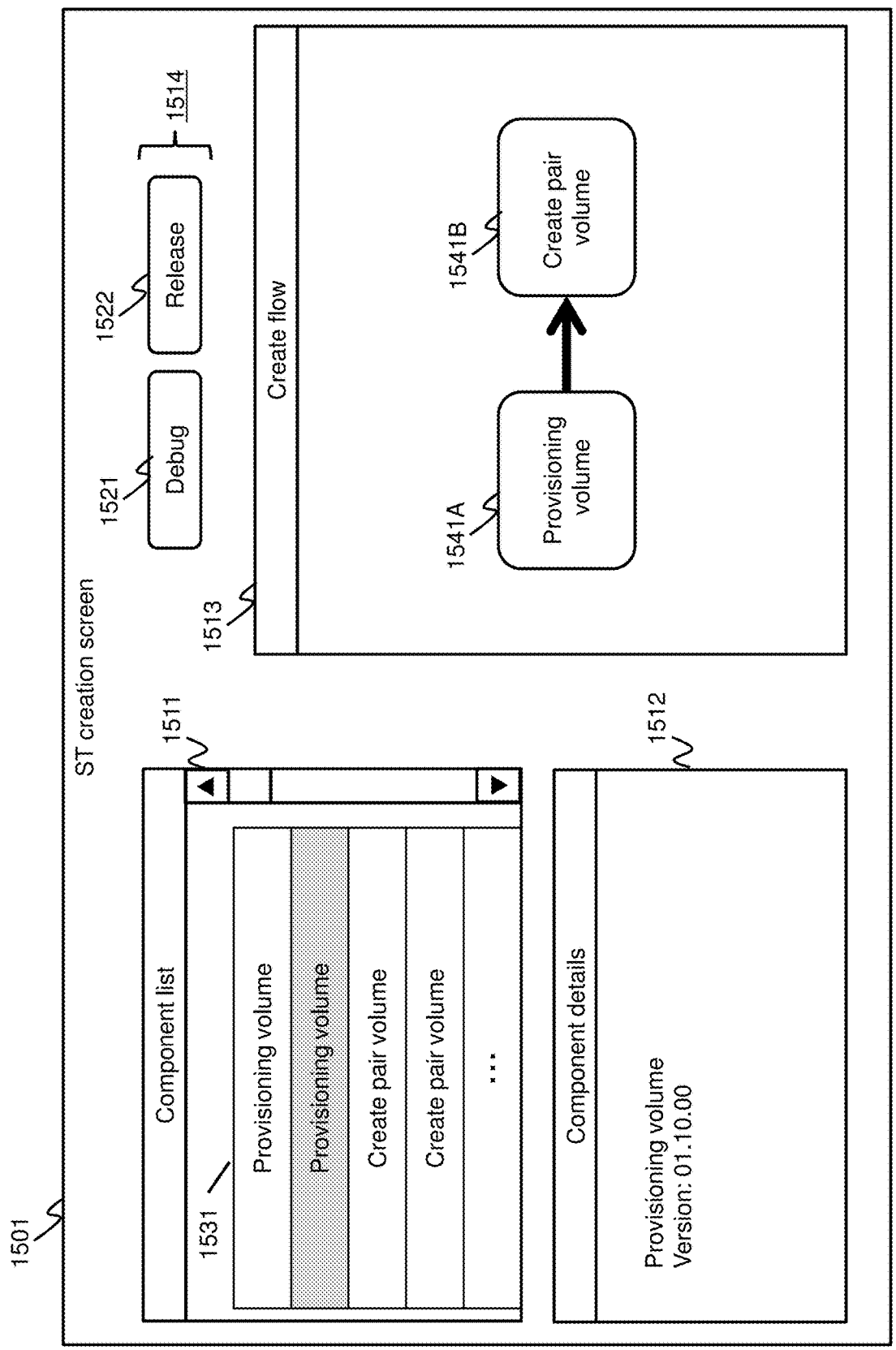
FIG. 15 illustrates an example of an ST creation screen.

FIG. 15 illustrates an example of the ST creation screen.

The ST creation screen includes a component list plane 1511, a component detail plane 1512, a flow creation plane 1513, and an ST type selection tool 1514.

In the component list plane 1511, a component name list 1531 of managed components (component name list recorded in the component management table) is displayed by the management program 431.

In the component detail plane 1512, details (for example, the component name and version) corresponding to a component selected from the component list 1531 are displayed by the management program 431.

In the flow creation plane 1513, icons 1541A and 1541B for components selected from the component list 1531 are displayed in accordance with a user operation, and a service flow is defined based on the connection of the component icons 1541A and 1541B. For example, in accordance with a user operation of dragging and dropping components selected from the component list 1531 to the flow creation plane 1513, the management program 431 displays the icons 1541A and 1541B for the components on the flow creation plane 1513. Each time a component is dragged and dropped from the component list 1531, the management program 431 adds a component icon to the flow creation plane 1513. In accordance with the user operation, the management program 431 puts an arrow link from the first component icon to the second component icon, thereby defining that the second component is executed next to the first component.

The ST type selection tool 1514 includes a Debug button 1521 and a Release button 1522. When the Release button 1522 is pressed, the management program 431 saves the ST for the service flow displayed in the flow creation plane 1513 so that the ST type is "Release". When the Debug button 1521 is pressed, on the other hand, the management program 431 saves the ST for the service flow displayed in the flow creation plane 1513 so that the ST type is "Debug".

The above description is the configuration of the ST creation screen 1501.

When a component is newly imported, the component name of the newly imported component is also included in the component list 1531 on the ST creation screen 1501. When the ST creating user selects the component name of the new component and performs a user operation for displaying a related ST (designates the selected component name as a target of the related ST display), the management program 431 displays a related ST list for each version on a popup, for example.

Figure 16:
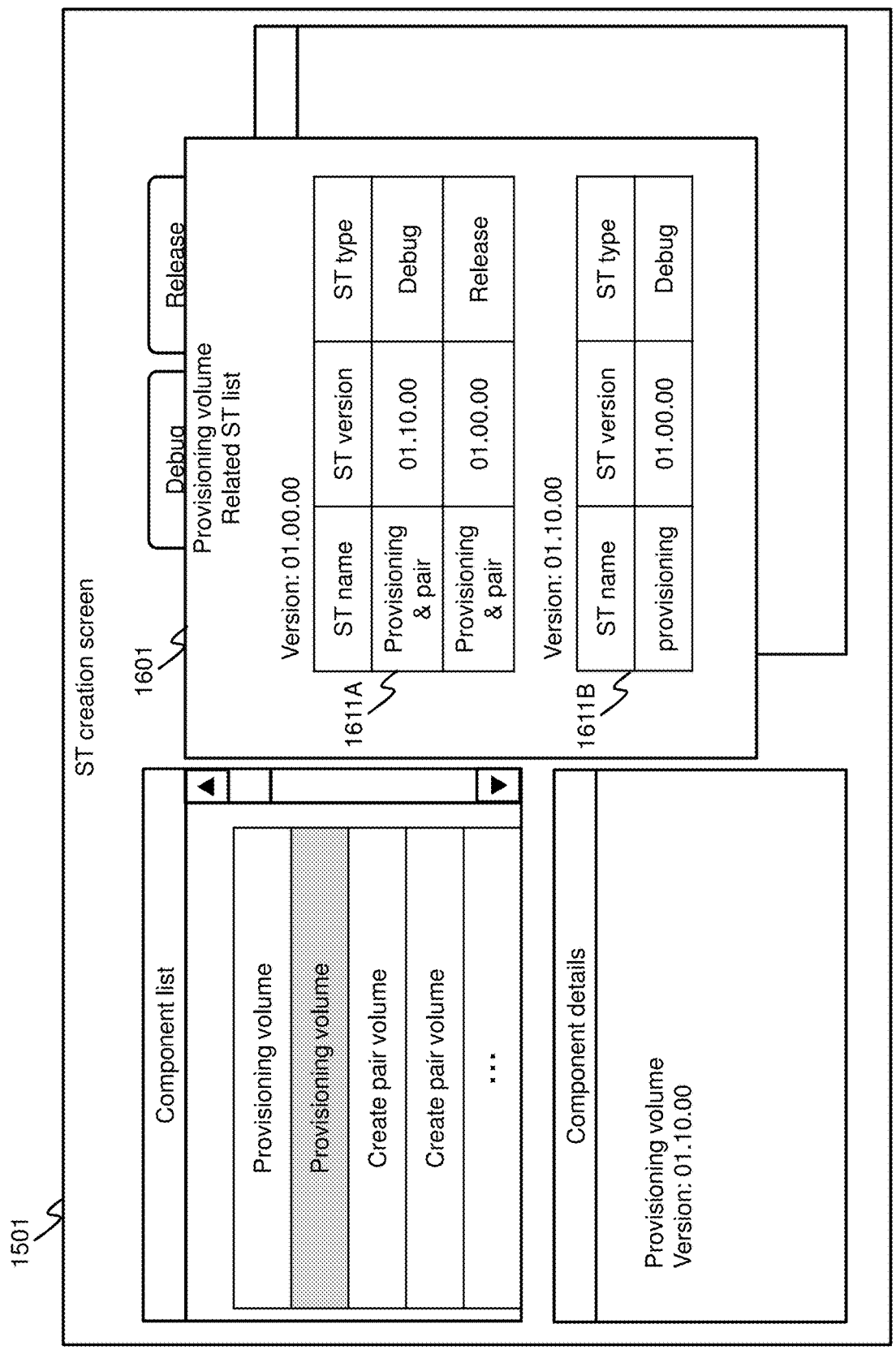
FIG. 16 illustrates an example of a related ST list for each version.

FIG. 16 illustrates an example of the related ST list for each version.

The management program 431 specifies, from the component management table 421, the version and component uk of the same component name as the component name selected from the component list 1531. The management program 431 specifies a flow uk corresponding to the specified component uk from the flow management table 424, and specifies the ST name and ST type corresponding to the specified flow uk from the ST management table 423. In this manner, the management program 431 generates and displays related ST lists (lists of the ST names, versions, and ST types of the related STs) 1611A and 1611B for the respective versions of the component selected from the component list 1531. Those lists 1611A and 1611B are displayed on a popup screen 1601 on the ST creation screen 1501, for example.

For example, when a new component is imported, the ST creating user generally considers whether the new component needs to be adapted to an existing ST that uses the component with the old version. In this case, if the user cannot grasp the relation between a component and an ST, the user cannot grasp which ST needs to be enhanced.

According to this embodiment, in regard to a component selected from the component list 1531, a related ST (an ST with which a component having the same component name as that of the selected component is associated) is displayed for each version. This enables the ST creating user to grasp the ST that uses the component having the same component name as that of the selected component. Consequently, when a new component is imported, the user can easily determine which service template needs to be replaced with the new component.

Note that the user operation for displaying a related ST list may be performed before the update of a component. For example, in order to determine whether or not to update a component, the ST creating user causes the management program 431 to display a related ST for the component. When it is found that there is no ST type "Release" for the component, the ST creating user may determine to update the selected component without updating the version. When it is found that the an ST type "Release" is present for the component, on the other hand, the ST creating user may determine to update the selected component together with the version.

By the way, as described above, a service can be created with use of the service creation screen based on an ST created with use of the ST creation screen 1501.

Figure 17:
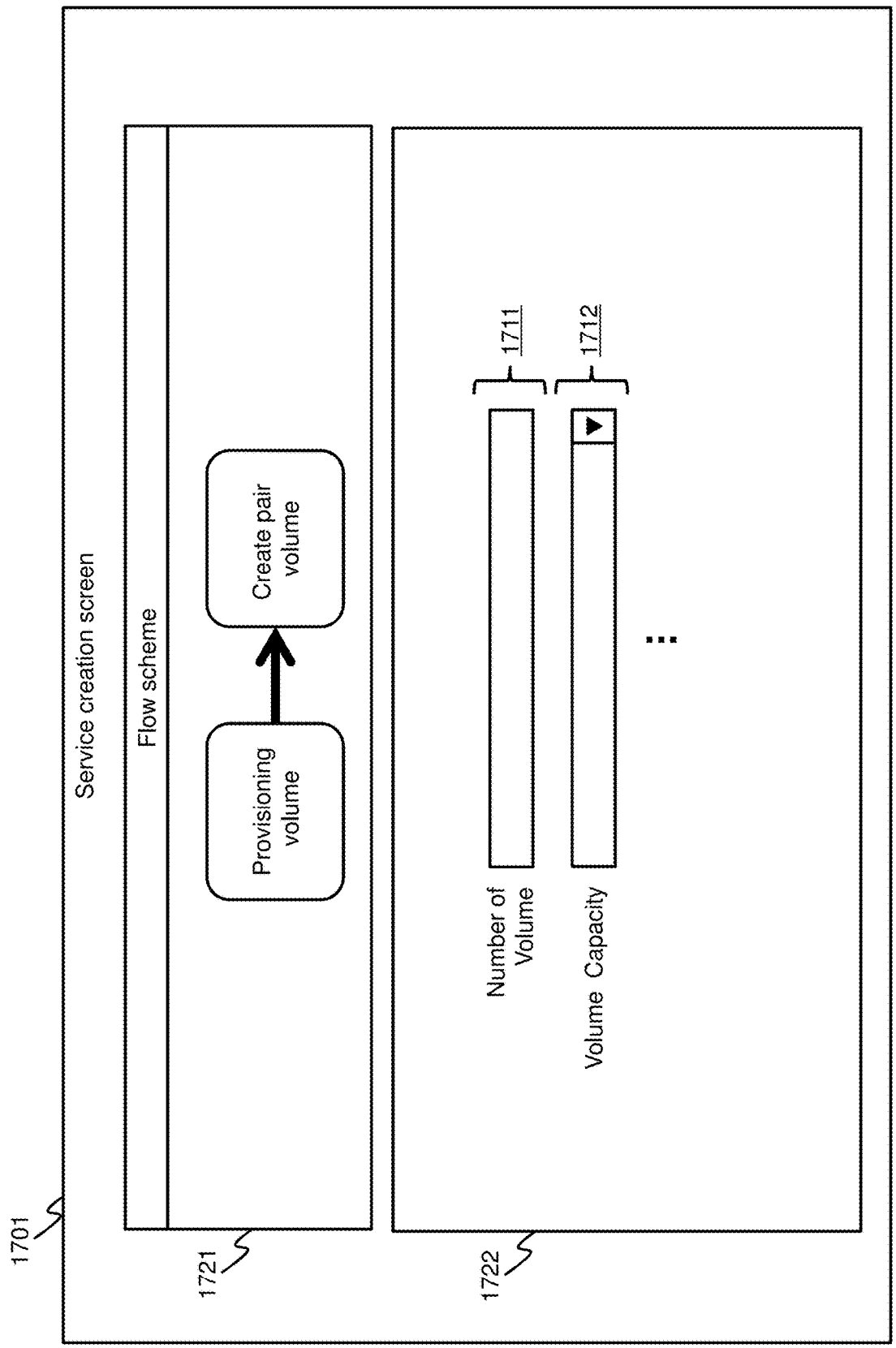
FIG. 17 illustrates a specific example of a service creation screen.

FIG. 17 illustrates a specific example of the service creation screen.

A service creation screen 1701 includes a flow scheme plane 1721 and a UI plane 1722. The management program 431 generates a schematic diagram of a service flow of a decided ST based on, for example, the flow management table 424, and displays the generated schematic diagram on the flow scheme plane 1721.

The management program 431 generates a UI based on customized UI generation information associated with an ST input property of the decided ST, and displays the generated UI on the UI plane 1722. For example, a default UI 1711 and a customized UI 1712 are mixed in the UI plane 1722 as illustrated in FIG. 17.

The customized UI has higher usability than the default UI and makes it easier for the service creating user to input the value. Accordingly, in the component list 1531 on the ST creation screen 1501 illustrated in FIG. 16, for example, whether or not valid customized UI generation information (customized UI generation information other than "Null") is associated with the component may be displayed in addition to the component name. When a plurality of components having the same component name include a component associated with a customized UI and a component not associated with a customized UI, the ST creating user selects the component associated with a customized UI as a component to be associated with the ST. In this manner, the user can create an ST whose values are easy to input in the service creation.

Note that, for example, a schematic diagram of the service flow of the ST may be displayed on the service creation screen 1701 as illustrated in FIG. 17.

Figure 18:
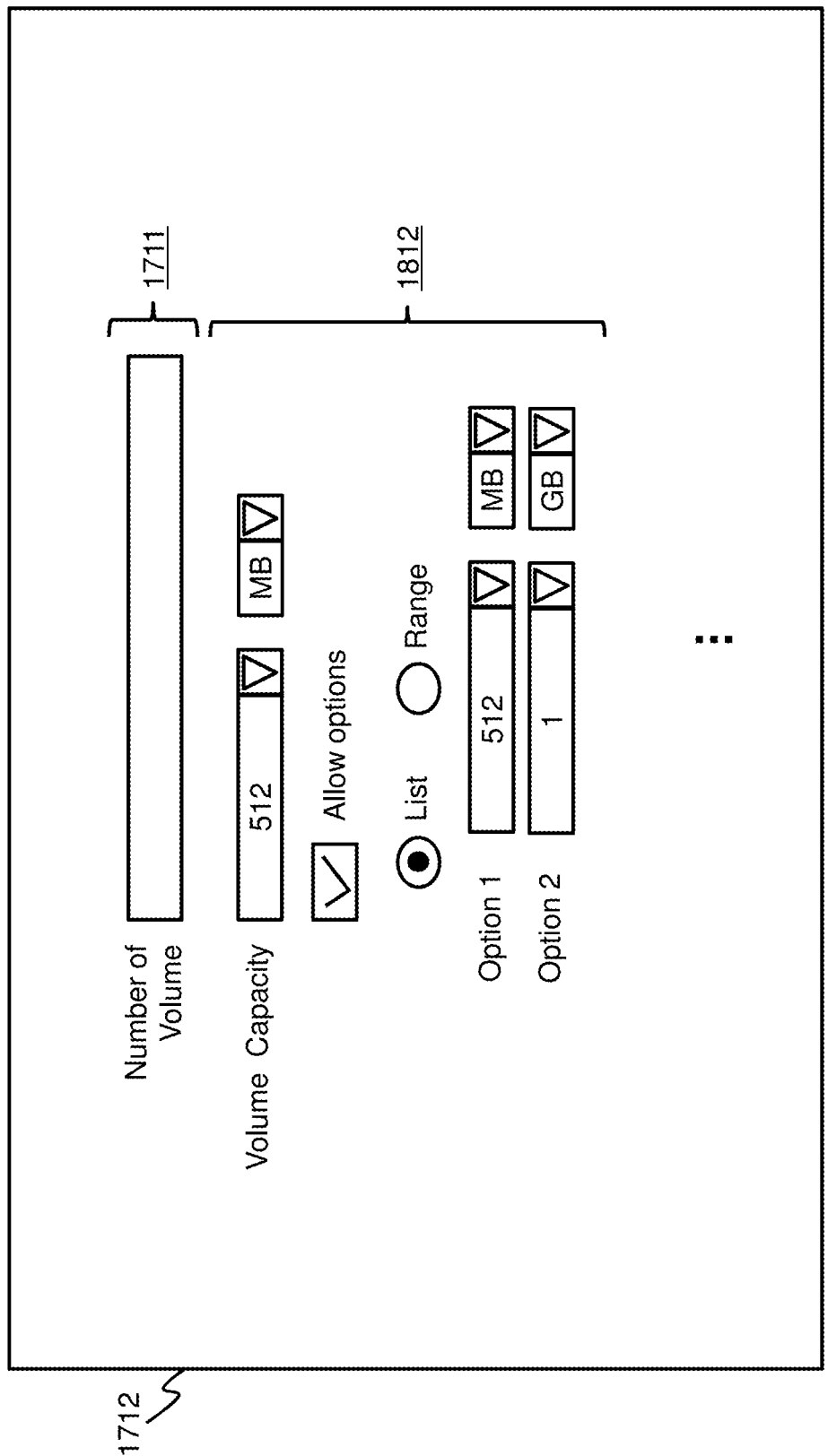
FIG. 18 illustrates a variation of a customized UI.

FIG. 18 illustrates a variation of the customized UI.

Referring to FIG. 18, a customized UI 1812 including a display name "Volume Capacity" includes widgets other than a pull-down menu, such as radio buttons and a check box. As described above, the customized UI may include one or more types of widgets.

Figure 19:
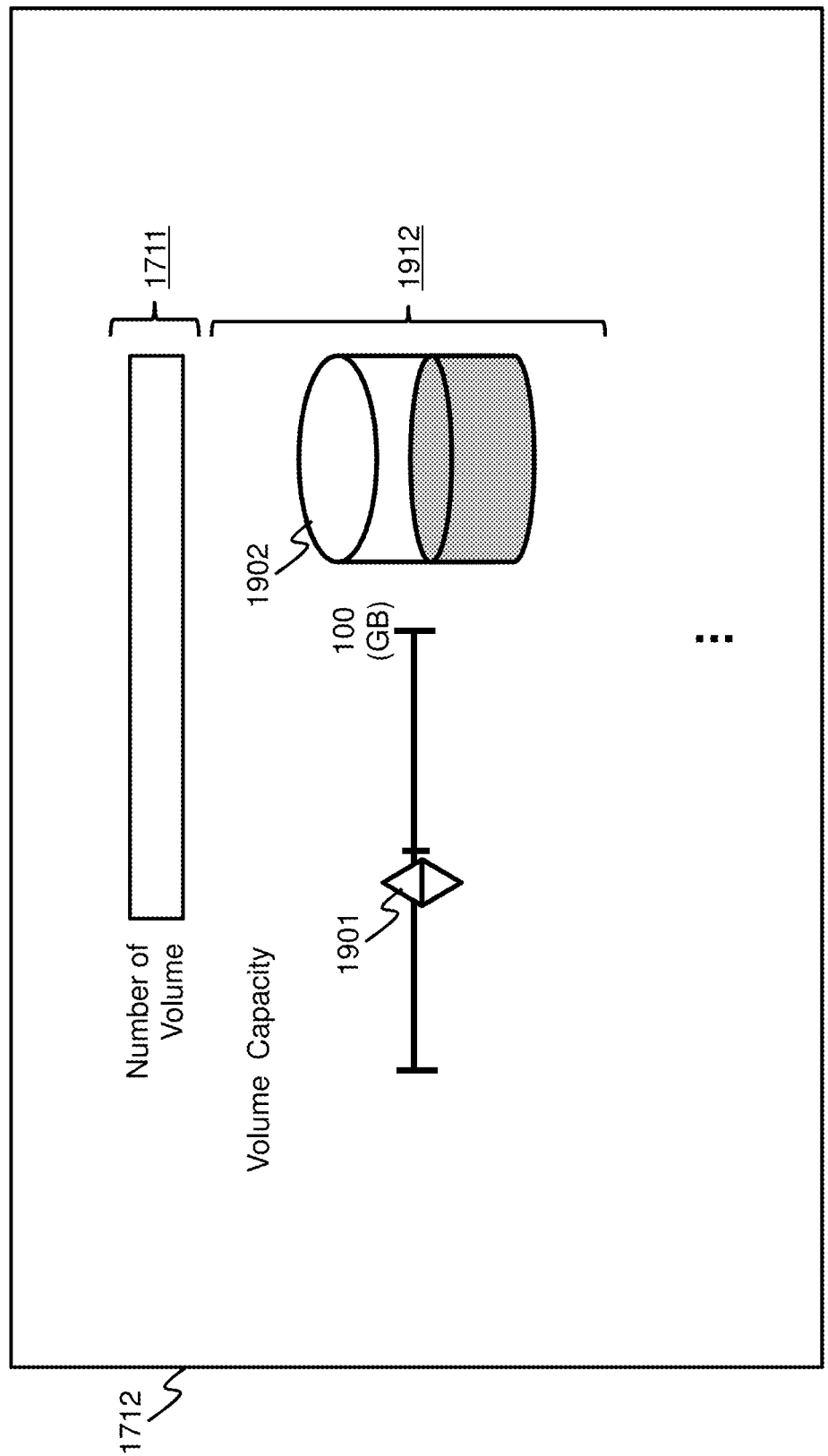
FIG. 19 illustrates another variation of the customized UI.

FIG. 19 illustrates another variation of the customized UI.

Referring to FIG. 19, a customized UI 1912 including a display name "Volume Capacity" is a customized UI with higher usability. For example, the value corresponding to the display name "Volume Capacity" may be input through adjustment of the position of a slider 1901. The upper limit of the value ("100 GB" in the example of FIG. 19) may be, for example, a capacity upper limit that is calculated by the management program 431 based on information related to the configuration of the storage apparatus 304. The customized UI 1912 may display an object 1902 representing the usable volume capacity. The management program 431 may change the usable volume capacity represented by the object 1902 in response to the adjustment of the position of the slider 1901 for "Volume Capacity".

Processing to be performed in this embodiment is now described.

Figure 20:
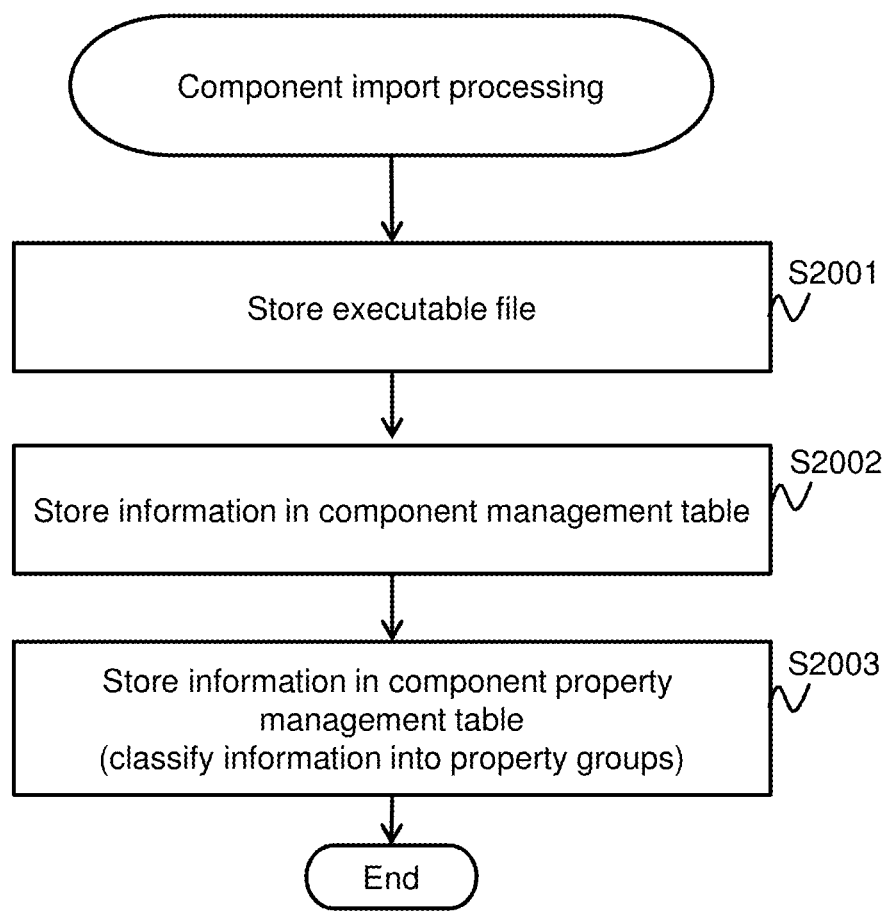
FIG. 20 is a flowchart of component import processing.

FIG. 20 is a flowchart of component import processing.

The management program 431 receives a component information package (for example, including an executable file and component properties), and stores the component executable file in the memory 412 (or an auxiliary storage apparatus such as an external storage apparatus) (S2001). The component information package may include a part or all of customized UI generation information.

The management program 431 stores information on the executable file, such as the path name, in the component management table 421 (S2002).

The management program 431 stores information related to the component properties in the component property management table 422 (S2003). Note that a part of attributes in the component property management table 422 may be added or changed by the component providing user or the ST creating user after the import. For example, it is not preferred that the display name 703 be confused with the display names of other components. Then, the arrangement of UIs can be grouped based on the property group, and hence the property group may be added or changed by the ST creating user.

In this embodiment, the customized UI generation information is not present in the operation automation system 301 in advance (not built in the operation automation system 301), but is input along with the import of the component. In this manner, a UI suited to the imported component can be automatically added as an operation target of the operation automation system 301 at an appropriate timing of the import of the component.

Note that, even when a component has the same component name as the imported component, if the version of the component is different, the component import processing allocates a new component uk to the imported component in the component management table. This prevents a component that is used for an already created service template or service from being automatically changed. This advantage is as described above. However, even when the version of a component is different from the imported component, if the component has the same component name, the same component uk as that of the previous version may be allocated to the imported component so that a component that is used for an already created service template or service is automatically changed by the component import processing.

Figure 21:
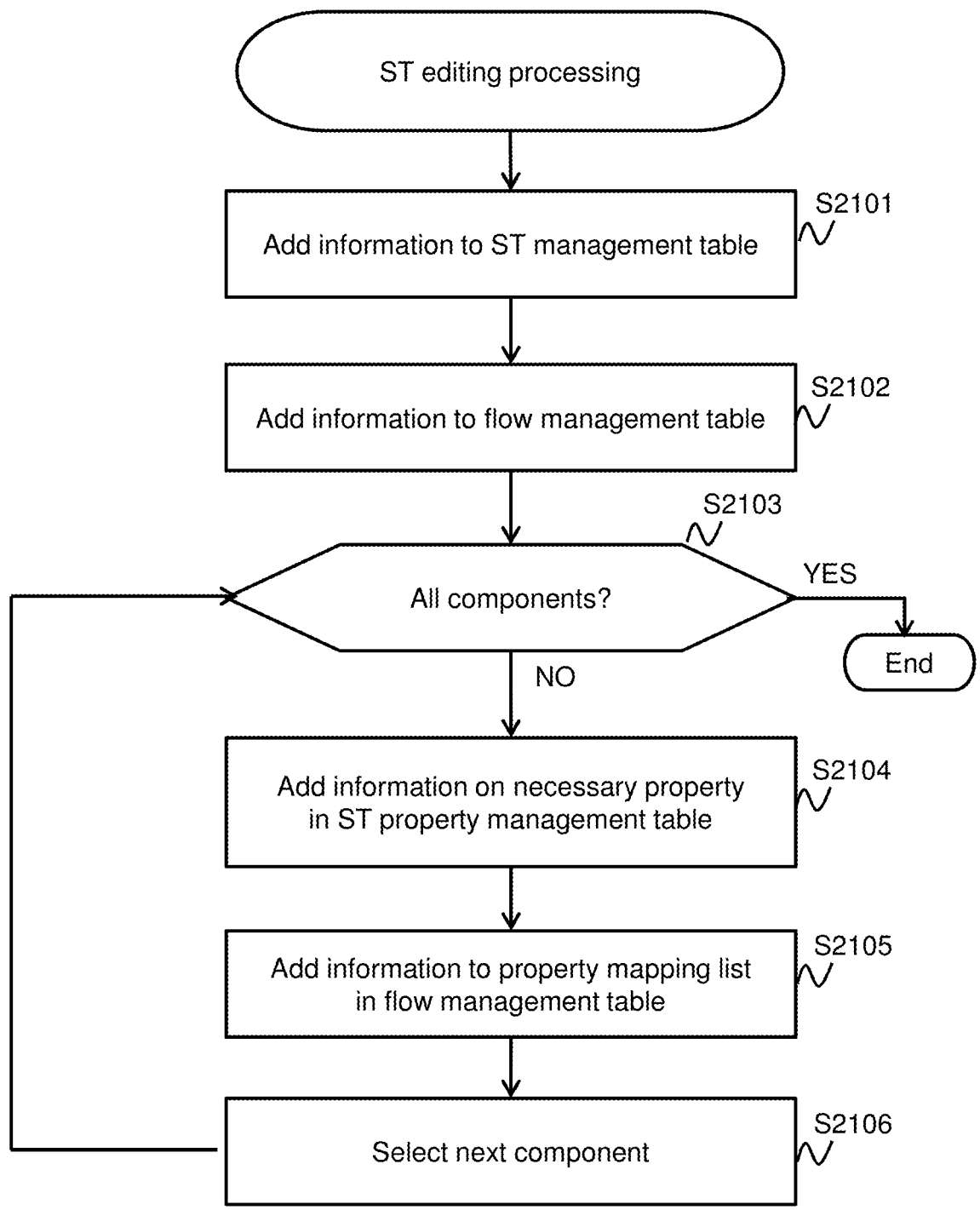
FIG. 21 is a flowchart of ST editing processing.

FIG. 21 is a flowchart of ST editing processing.

ST editing processing is processing in the ST creation processing. The ST creating user places necessary components on the flow creation plane 1513 on the ST creation screen 1501 to determine the order of components. The ST editing processing illustrated in FIG. 21 is processing for temporarily saving the ST for the service flow on the flow creation plane 1513.

The management program 431 stores information on the ST (such as the ST name, the ST version, and the ST uk) in the ST management table 423 (S2101). The management program 431 stores information on the service flow of the ST (such as the flow uk and the component uk list) in the flow management table 424.

The management program 431 performs S2104 to S2106 on every component indicated in the component uk list for the service flow of the ST (for example, in the component order indicated by the component uk list) (S2103). Specifically, the management program 431 stores information related to an ST property corresponding to a component property of the component selected from the component uk list in the ST property management table 425 (S2104). This processing involves storing the values of the customized UI generation information 708 and the property group 707 of the component property management table in the customized UI generation information 1008 and the property group 1007 of the ST property management table 425. In S2104, for example, the management program 431 may determine whether or not the output property of the previous component and the input property of the next component can be associated with each other (whether or not the key names are the same), and when the determination result is positive, the management program 431 may associate the output property and the input property with each other. The management program 431 adds information that is based on the ST property stored in S2104 to the corresponding property mapping list 904 (S2105). Then, the management program 2104 selects the next component from among the components indicated in the component uk list (S2106). Note that, when an input property of a component is associated with an output property of another component, the registration in the ST property management table 425 may be omitted.

Figure 22:
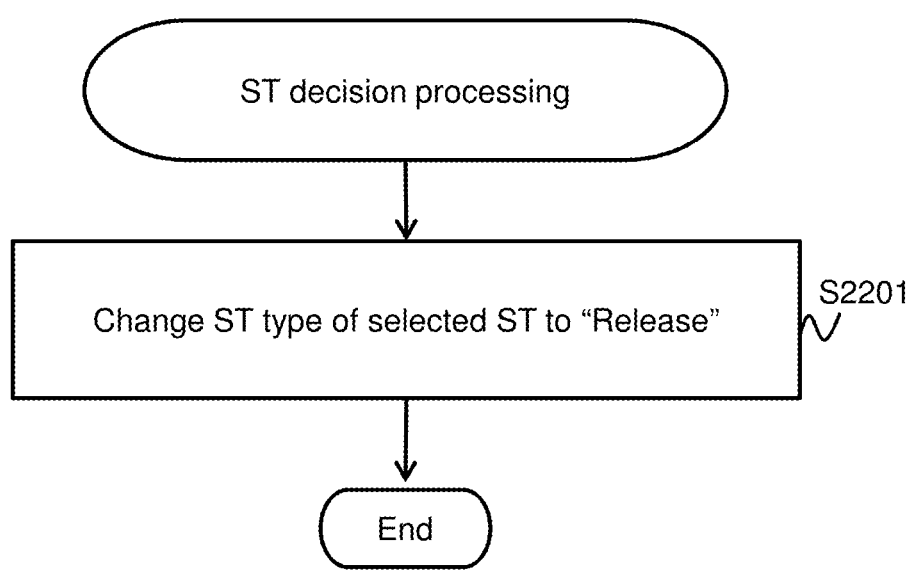
FIG. 22 is a flowchart of ST decision processing.

FIG. 22 is a flowchart of ST decision processing.

The management program 431 receives a designation of the ST type "Release" for an ST selected from among created (registered) STs, and changes the ST type of the selected ST from "Debug" to "Release" (S2201). The management program 431 prohibits the editing of the ST whose ST type has been changed to "Release". Conceivable examples of prohibiting the editing include denying a user operation for the editing and not allowing the user to select a not-editable ST in the process of the editing.

Figure 23:
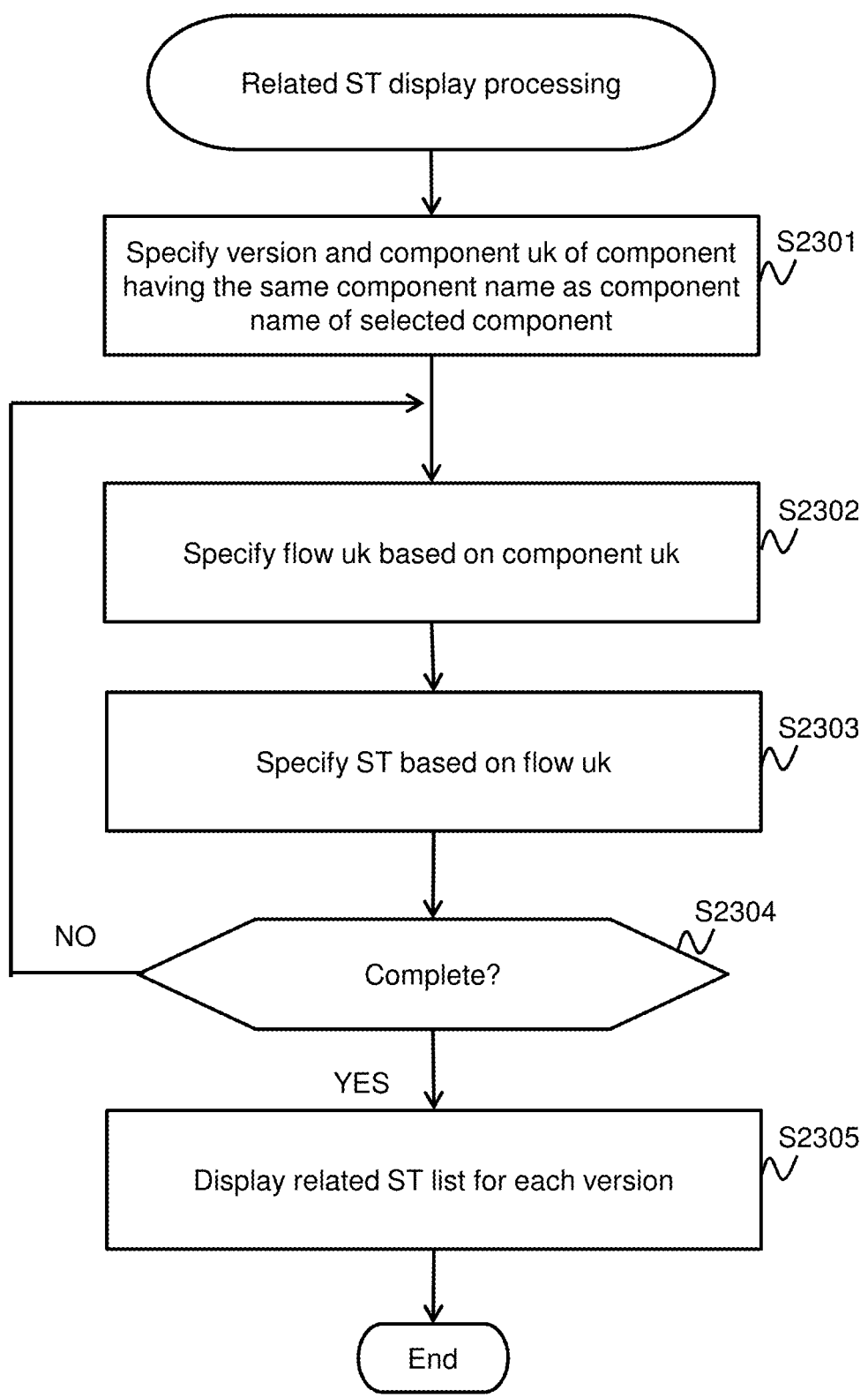
FIG. 23 is a flowchart of related ST display processing.

FIG. 23 is a flowchart of related ST display processing.

The management program 431 specifies, from the component management table 421, the version and component uk of the same component name as the component name of the selected component (for example, the component selected from the component list 1531 in FIG. 15) (S2301). The management program 431 specifies a flow uk corresponding to the specified component uk from the flow management table 424 (S2302). The management program 431 specifies the ST name and ST type corresponding to the specified flow uk from the ST management table 423 (S2303). The management program 431 performs S2302 and S2302 on every component uk specified in S2301 (S2304). After that, the management program 431 generates and displays a related ST list (a list of the ST name, version, and ST type of a related ST) for each version of the selected component (S2305).

Figure 24:
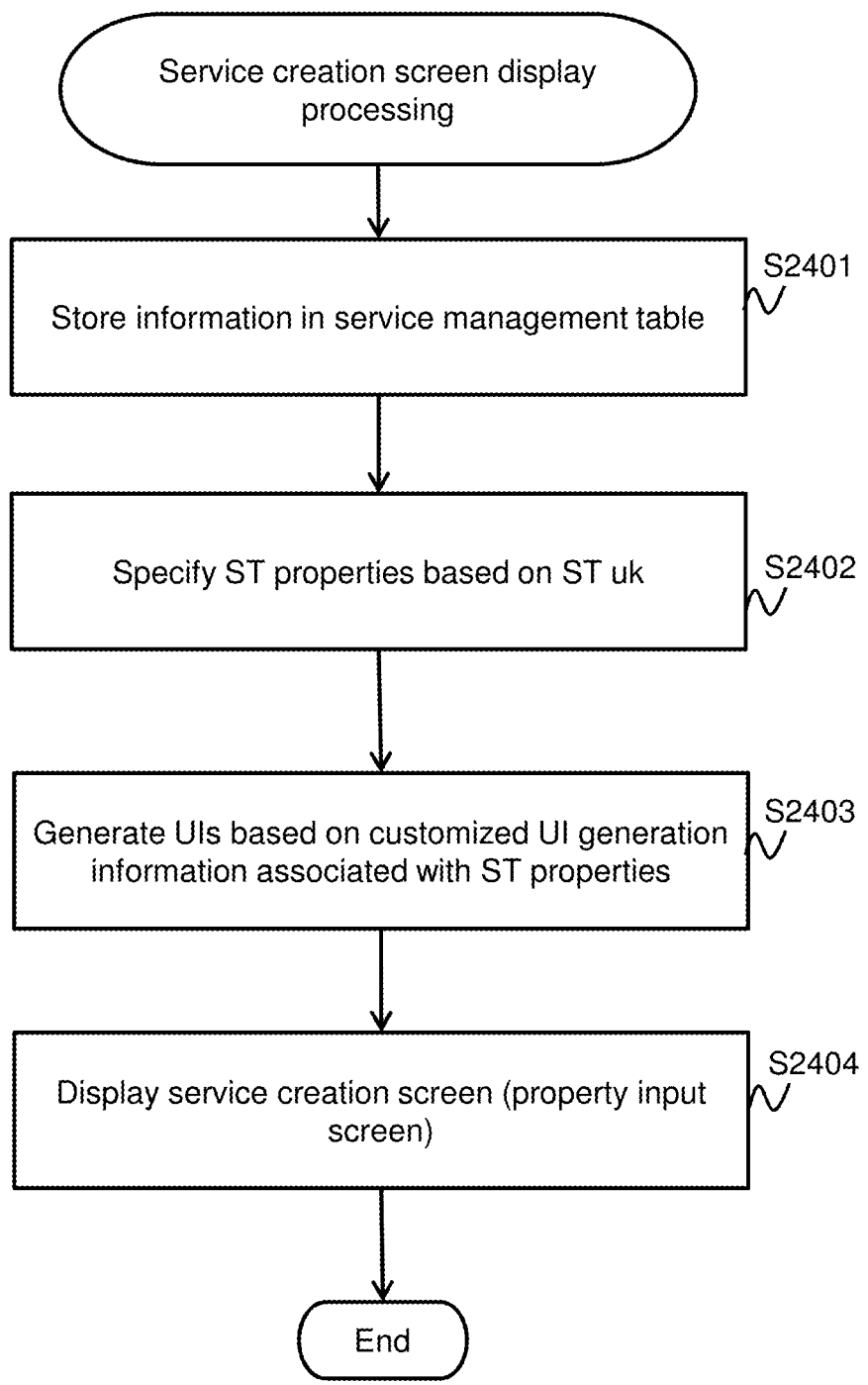
FIG. 24 is a flowchart of service creation screen display processing.

FIG. 24 is a flowchart of processing for displaying the service creation screen 1701.

The management program 431 receives a selection of the decided ST from the service creating user, and stores service information (for example, the ST uk) corresponding to the selected ST in the service management table 426 (S2401). The management program 431 specifies information related to all ST properties corresponding to the ST uk of the selected ST from the ST property management table 425 (S2402). The management program 431 generates a UI (a default UI or a customized UI) for each ST input property based on the customized UI generation information 1008 associated with the specified ST property (S2403), and displays the service creation screen 1701 (property input screen) including the generated UI (S2404).

Note that, in place of the customized UI generation information 1008 referred to in S2403, the management program 431 may specify a component property of the corresponding component in consideration of the value of the property mapping list 904 in the flow management table 424, and refer to the customized UI generation information 708 in the component property management table 422. The reason is that an UI on the service generation screen can be determined by referring to the customized UI generation information on the component directly or indirectly so that a highly convenient screen can be generated without the need for the service template creating user to design a service creation screen for each service template.

Figure 25:
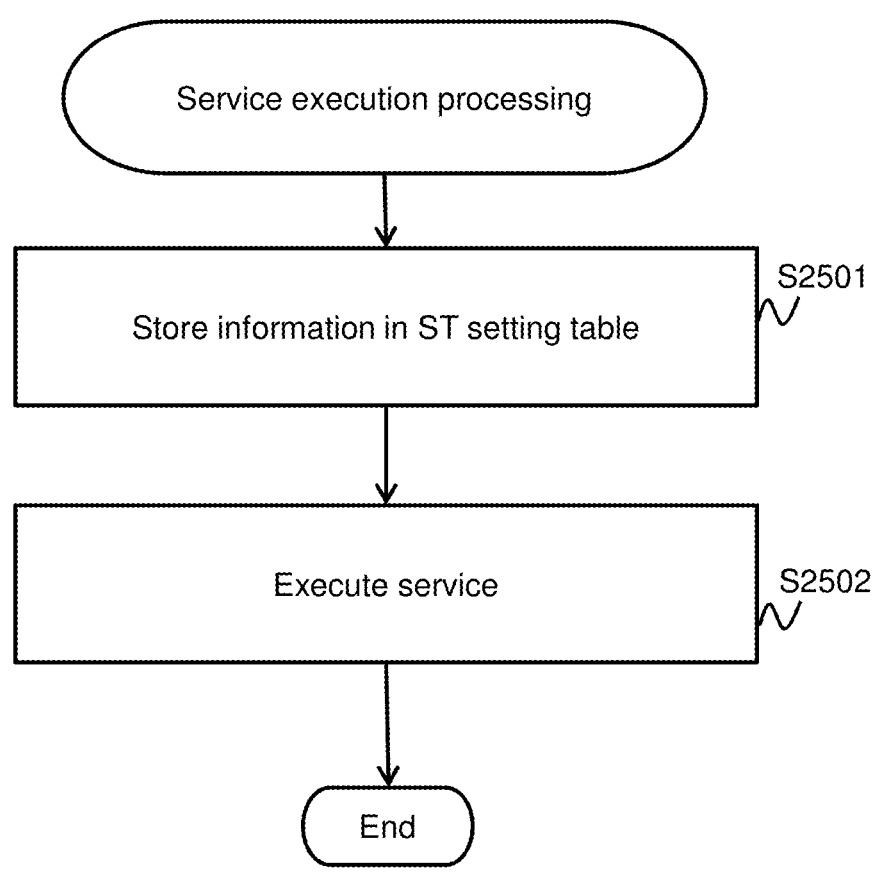
FIG. 25 is a flowchart of service execution processing.

FIG. 25 is a flowchart of service execution processing.

Service execution processing is started when a value is input to the UI on the screen displayed by the processing in FIG. 24 and the execution of the service is designated by the service creating user. Note that the service execution processing may diverge when the created service is registered to be in an execution queue and the execution of the service in the execution queue is instructed.

The management program 431 stores the value input on the service creation screen 1701 (property input screen) in the service property setting table 427 (S2501). After that, the management program 431 executes a service based on the input set value (S2502). Specifically, the management program 431 performs the following procedure.

(A) The management program 431 selects a service template that is the base of the service.

(B) The management program 431 refers to the component uk list 903 for the flow of the service template selected in (A), and specifies components to be executed together with the execution order.

(C) The management program 431 executes the components as specified in (B). In (C), the management program 431 refers to the property mapping list 904 to select an input property of an appropriate service property or an output property of another component, and inputs the value thereof. The thus input value is the input value to be set to the input property of the component to be executed. Note that "executing a component" refers to executing an executable file described in the executable file path 604.

(D) After the components are executed in accordance with the execution order, the management program 431 refers to the property mapping list 904 to select an output property of the component associated with the output property of the service template, and displays the value thereof as the output property of the service template as a result of executing the service. It should be understood that the processing for customized UIs and property groups may be applied to the service execution result.

Note that the processing content described in the executable file typically involves changing the configuration of the operation target apparatus or transmitting a request to acquire configuration information, metric information, and statuses from the operation target apparatus directly or indirectly to the operation target apparatus. Conceivable examples of directly transmitting a request to the operation target apparatus include when a request is directly transmitted from the operation automation system to the operation target apparatus. Conceivable examples of indirectly transmitting a request include when a request is transmitted to the computer management system 302 and when a maintenance message is transmitted to a maintenance engineer of the operation target apparatus and the maintenance engineer implements a maintenance task as operation of the operation target apparatus.

Figure 26:
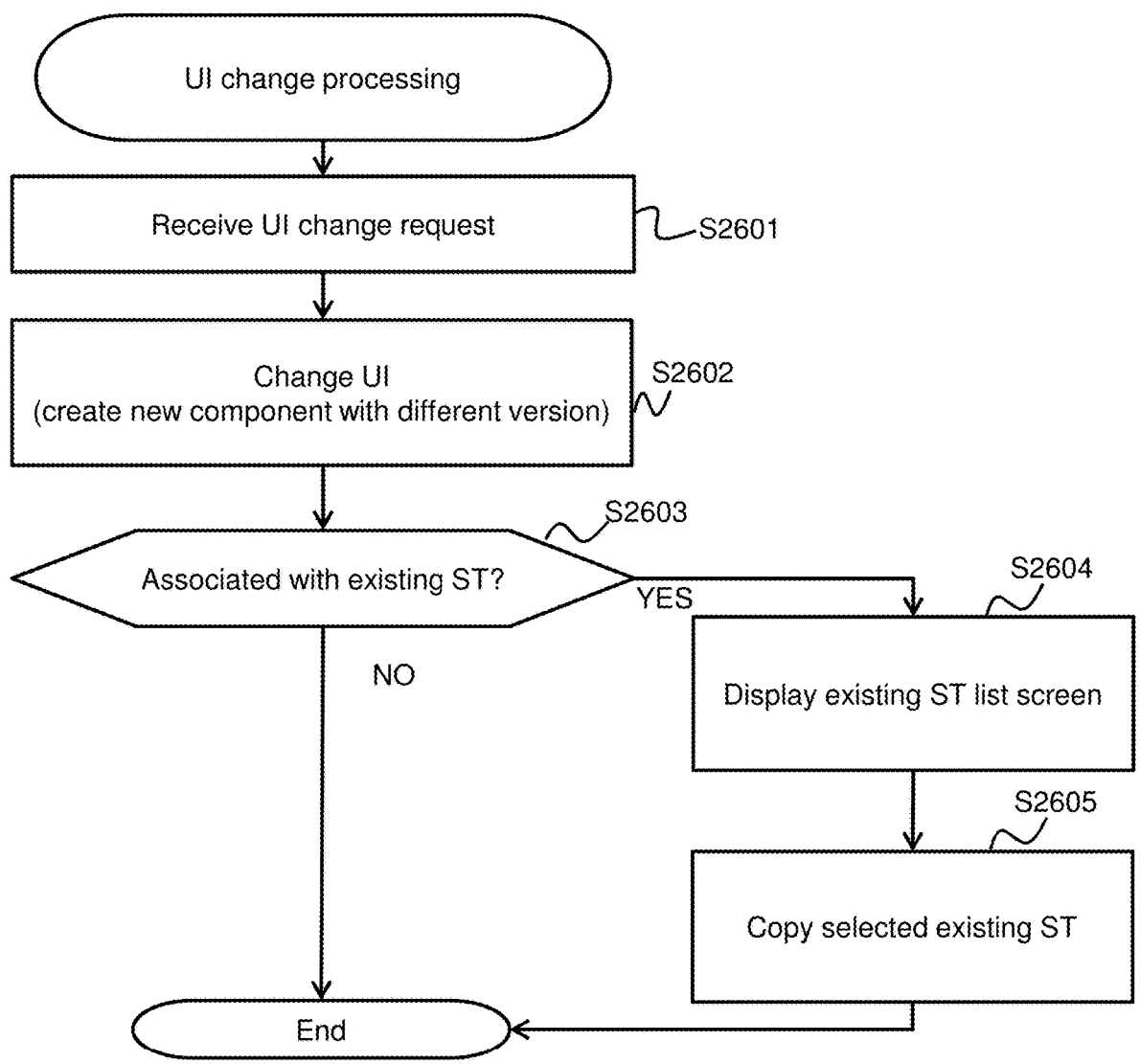
FIG. 26 is a flowchart of UI change processing.

FIG. 26 is a flowchart of UI change processing.

The management program 431 receives a UI change request (S2601), and executes S2602. In S2602, the management program 431 changes the UI in accordance with the UI change request. When the UI is changed, the management program 431 creates a copy of a component that is associated with the UI before the change, and allocates a new version (a version different from the version of the component that is associated with the UI before the change) to the component copy. The management program 431 then associates the changed UI (customized UI generation information representing the changed UI) with the component copy. The management program 431 stores (adds) information related to the component copy (the component with the new version) in the component management table 421, and stores (adds) information related to component properties associated with the component copy in the component property management table 422. Note that, when the component that is associated with the UI to be changed is not associated with any existing ST (or any existing decided ST (an ST whose ST type is "Release")), the management program 431 may receive the update of the UI without creating a copy of the component.

The management program 431 determines whether or not the UI designated by the change request is associated with an existing ST (S2603).

When the determination result in S2603 is positive (S2603: YES), the management program 431 displays a screen of a list of existing STs associated with existing components (S2604). In this case, the management program 43 creates a copy of the existing ST selected by the user (for example, creates a new ST with a different version based on the existing ST) (S2605), and replaces the existing component used for the created ST copy with a component having a new version. In this manner, the changed UI is prevented from being associated with the existing ST. The "existing ST" as used herein refers to an ST whose ST type is "Release". An ST whose ST type is "Debug" may be excluded from existing STs.

Note that the component UI change processing may be implemented in other ways than the above. For example, when the component providing user imports a component whose version is changed to the new one due to the update of the UI or imports a service template as a component, the version of the component is upgraded due to a change in customized UI generation information related to the service template.

While one embodiment has been described, the embodiment is merely illustrative to describe this invention and is not intended to limit the scope of this invention to only the embodiment. This invention can be implemented in various other forms.

REFERENCE SIGNS LIST

301 Operation automation system
311 Management server
312 Management client

The invention claimed is:

1. A management system, comprising:
   an interface device coupled to an operation target system including one or more operation target apparatuses;
      a storage resource configured to store a management program; and
      a processor configured to execute the management program,
      the processor being configured to execute the management program to:
      manage a plurality of component input properties and a plurality of components each including a processing content to be executed based on an input value that is input to the component input property;
      create or edit a service template that is associated with one or more components and an execution order and that includes one or more template input properties;
      display the template input properties for each property group, and receive a designation of a service template and an input value to be input to the template input property;
      generate, based on the designated input value and the service template, an operation service for executing the processing content included in the component using the designated input value;
      execute the generated operation service to operate the operation target apparatus;
      store an identifier and a version of the component in the storage resource as the component management;
      store, as an association between the service template and the component, a correspondence relation between the service template and the identifier and version of the associated component in the storage resource;
      receive a user operation for displaying a correspondence relation between the component and the service template;
      specify an identifier and a version of a component to be subjected to the user operation;
      select a service template constituted by a component having the specified component identifier and the specified version; and
      display an identifier of the specified service template.

2. The management system according to claim 1, wherein the processor is configured to:
   store, in the storage resource, customized UI generation information that corresponds to the component input property and that specifies a UI element used for input to the component input property;
   manage a correspondence relation between the component input property and the template input property; and
   in order to generate a service creation screen to be displayed when an input value is designated:
      determine to display a UI element corresponding to the template input property on the service creation screen based on the correspondence relation and the customized UI generation information; and
      as processing for importing a second component that has the same component identifier as a component identifier of a first component being managed and that has a new version:
         maintain a correspondence between the first component and a service template that is associated thereto and has been already created before the import, to avoid changing the service creation screen due to the import.

3. The management system according to claim 2, wherein the processor is configured to:
   manage whether a status type of the service template is decided or not;
   receive a user operation for designating and editing the service template; and
   make a control to deny the user operation or to prevent the user operation from being designated when the status type of the service template is decided.

4. The management system according to claim 3, wherein the processor is configured to:
   recognize a part of users as a service template creating user and a service creating user;
   permit the service creation by the service creating user for a service template whose status type is decided; and
   inhibit the service creation by the service creating user for a service template whose status type is a status other than being decided.

5. The management system according to claim 3, wherein the processor is configured to:
   determine, when the customized UI generation information is invalid, a UI element of a corresponding template input property as a text field.

6. The management system according to claim 2, wherein the processor is configured to,
   determine, based on property groups to which a plurality of template input properties respectively belong, to display one or more UI elements, which respectively correspond to one or more template input properties belonging to the same property group, collectively on the service creation screen.

7. A non-transitory computer readable storage medium storing a computer program for causing a computer coupled to an operation target system including one or more operation target apparatuses to execute:

managing a plurality of component properties and a plurality of components each including a processing content to be executed based on an input value that is input to the component input property;

creating or editing a service template that is associated with one or more components and an execution order and that includes one or more template input properties;

displaying the template input properties for each property group, and receiving a designation of a service template and an input value to be input to the template input property;

generating, based on the designated input value and the service template, an operation service for executing the processing content included in the component using the designated input value;

executing the generated operation service to operate the operation target apparatus;

storing an identifier and a version of the component in a storage resource as the component management;

storing, as an association between the service template and the component, a correspondence relation between the service template and the identifier and version of the associated component in the storage resource;

receiving a user operation for displaying a correspondence relation between the component and the service template;

specifying an identifier and a version of a component to be subjected to the user operation;

selecting a service template constituted by a component having the specified component identifier and the specified version; and displaying an identifier of the specified service template.

8. The non-transitory computer readable storage medium storing a computer program according to claim 7, causing the computer to execute:

storing, in the storage resource, customized UI generation information that corresponds to the component input property and that specifies a UI element used for input to the component input property;

managing a correspondence relation between the component input property and the template input property;

in order to generate a service creation screen to be displayed when an input value is designated:

determining to display a UI element corresponding to the template input property on the service creation screen based on the correspondence relation and the customized UI generation information; and as processing for importing a second component that has the same component identifier as a component identifier of a first component being managed and that has a new version:

maintaining a correspondence between the first component and a service template that is associated thereto and has been already created before the import, to avoid changing the service creation screen due to the import.

9. The non-transitory computer readable storage medium storing a computer program according to claim 8, causing the computer to execute:

managing whether a status type of the service template is decided or not;

receiving a user operation for designating and editing the service template; and making a control to deny the user operation or to prevent the user operation from being designated when the status type of the service template is decided.

10. The non-transitory computer readable storage medium storing a computer program according to claim 9, causing the computer to execute:

recognizing a part of users as a service template creating user and a service creating user;

permitting the service creation by the service creating user for a service template whose status type is decided; and inhibiting the service creation by the service creating user for a service template whose status type is a status other than being decided.

11. The non-transitory computer readable storage medium storing a computer program according to claim 9, causing the computer to execute determining, when the customized UI generation information is invalid, a UI element of a corresponding template input property as a text field.

12. The non-transitory computer readable storage medium storing a computer program according to claim 8, causing the computer to execute, determining, based on property groups to which a plurality of template input properties respectively belong, to display one or more UI elements, which respectively correspond to one or more template input properties belonging to the same property group, collectively on the service creation screen.

* * * * *

UNITED STATES PATENT AND TRADEMARK OFFICE
CERTIFICATE OF CORRECTION

PATENT NO. : 10,768,978 B2
APPLICATION NO. : 16/261915
DATED : September 8, 2020
INVENTOR(S) : Kazuya Kousaka et al.

It is certified that error appears in the above-identified patent and that said Letters Patent is hereby corrected as shown below:

On the Title Page

Item (63), under the heading "Related U.S. Application Data":
"Continuation of application No.15/125,708, filed as application No. PCT/JP2014/081632 on Nov. 28, 2017, now Pat. No.10,223,157."

Should read:
-- Continuation of application No. 15/125,708, filed on Sept. 13, 2016, now Pat. No. 10,223,157, which is a 371 application of PCT/JP2014/081632, filed on Nov. 28, 2014. --

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*